United States Patent [19]
O'Neill et al.

[11] Patent Number: 5,987,099
[45] Date of Patent: Nov. 16, 1999

[54] LOW-POWER WIRELESS SYSTEM FOR TELEPHONE SERVICES

[75] Inventors: Keith Daniel O'Neill, Dunrobin; Alan Morris Redmond, Kanata; Jin Kue Wong, Nepean; Shoji Matsushita, Ottawa; David Charles Ploeg, Kanata; Christian Jacques Szpilfogel, Constance Bay; Peter David Gale, Ottawa; Garry Don Mah; William Owen Bird, both of Nepean, all of Canada

[73] Assignee: Northern Telecom Limited, Montreal, Canada

[21] Appl. No.: 08/320,849

[22] Filed: Oct. 7, 1994

Related U.S. Application Data

[63] Continuation of application No. 07/961,769, Oct. 16, 1992, abandoned.

[51] Int. Cl.[6] .................................................. H04M 11/00
[52] U.S. Cl. ............................... 379/60; 379/58; 379/59; 455/33.1; 455/33.2
[58] Field of Search .................................. 379/58, 59, 60, 379/63; 455/33.1, 33.2, 33.4, 54.1, 54.2, 56.1, 67.1

[56] References Cited

U.S. PATENT DOCUMENTS

| | | | |
|---|---|---|---|
| 4,833,702 | 5/1989 | Shitara et al. | 379/60 |
| 4,843,622 | 6/1989 | Yotsutani et al. | 379/59 |
| 4,852,148 | 7/1989 | Shibata et al. | 379/59 |
| 4,881,271 | 11/1989 | Yamauchi et al. | 379/58 X |
| 4,926,421 | 5/1990 | Kawano et al. | 455/56.1 X |
| 5,038,399 | 8/1991 | Bruckert | 379/59 X |
| 5,168,574 | 12/1992 | Gordon et al. | 455/9 |
| 5,175,867 | 12/1992 | Wejke et al. | 455/33.1 |
| 5,203,010 | 4/1993 | Felix et al. | 455/33.2 |
| 5,243,598 | 9/1993 | Lee | 379/63 X |
| 5,276,906 | 1/1994 | Felix | 379/60 X |

FOREIGN PATENT DOCUMENTS

| 2193861 | 2/1988 | United Kingdom | 379/61 |
|---|---|---|---|

*Primary Examiner*—Curtis Kuntz
*Assistant Examiner*—G. J. Oehling
*Attorney, Agent, or Firm*—Foley & Lardner

[57] ABSTRACT

A wireless telephone system provides telecommunications services for personal wireless telephone sets over an area which is divided into service cells. Each of the cells is defined by reception characteristics of a plurality of radio base stations within the cell. The telephone system includes a service controller and a port being wireline connected between each radio base station and the service controller. The service controller selects radio base stations for setting up radio links with wireless sets of calling or called persons. A base station which serves a wireless set and surrounding idle base stations monitor strengths of radio signals received from the wireless set and report running averages of the monitored signal strengths to the service controller. Movement of the wireless set from one cell to another cell during a call is detected as a drop in the running average reported by the serving base station. The service controller selects an idle base station to which the call is handed off based on the running averages reported by the idle base stations only idle base stations having a running average greater than the serving base station report their running average.

13 Claims, 21 Drawing Sheets

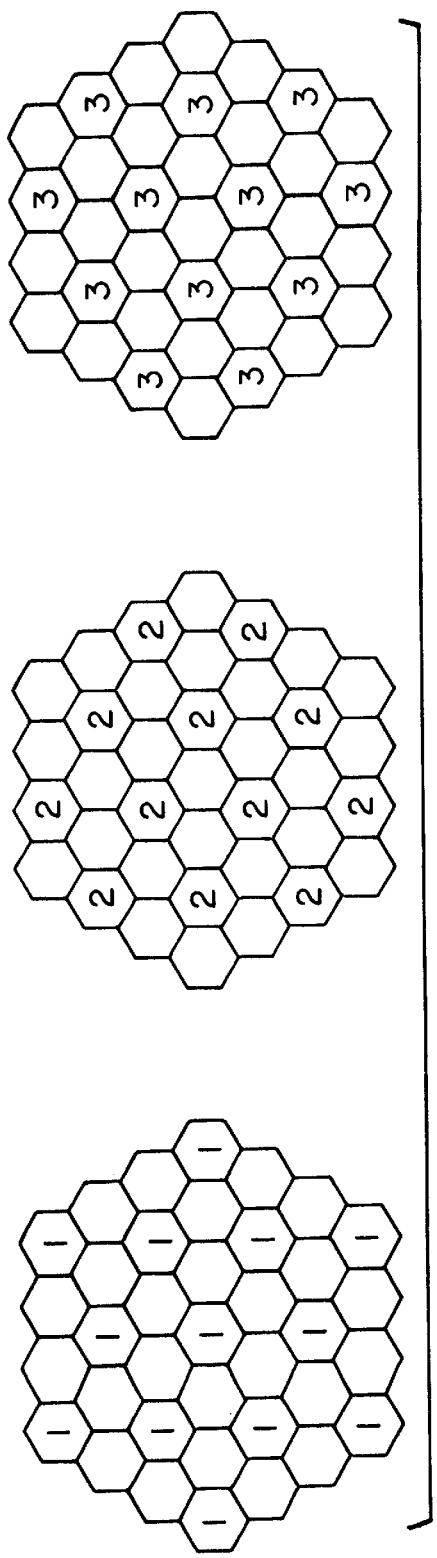
FIG. 9a PARTITION OF 37-CELL SYSTEM INTO CLUSTER OF THREE CELLS
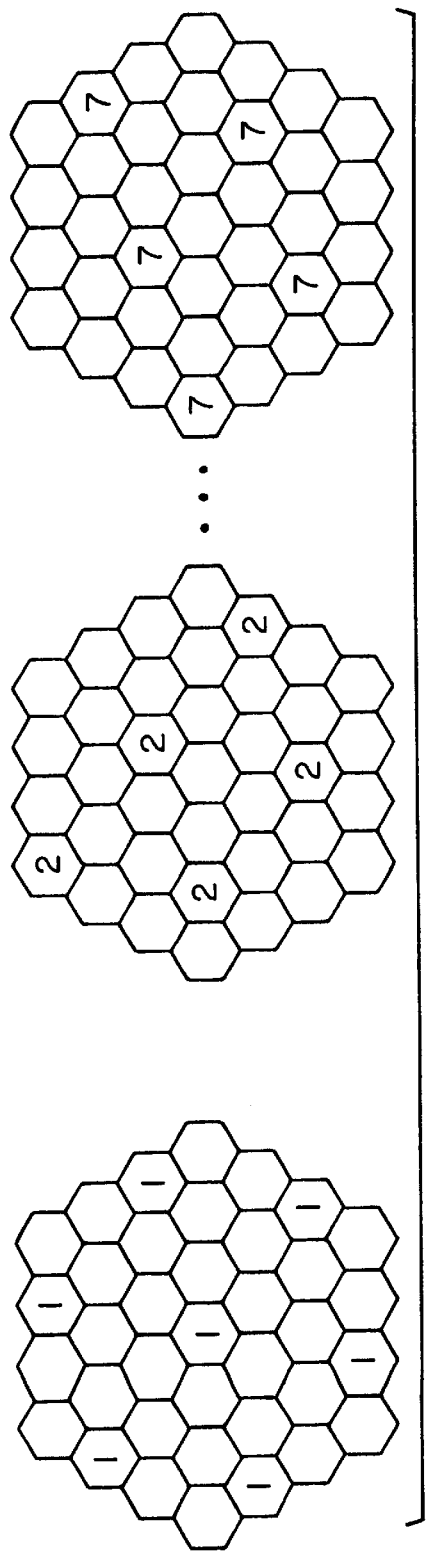
FIG. 9b PARTITION OF 37-CELL SYSTEM INTO CLUSTER OF SEVEN CELLS

RSSI VS DISTANCE CURVE BASED ON A $R^4$ MODEL

LINE SEGMENT APPROXIMATION

5,987,099

LOW-POWER WIRELESS SYSTEM FOR TELEPHONE SERVICES

This application is a continuation of application Ser. No. 07/961,769, filed Oct. 16,1992 now abandoned.

FIELD OF THE INVENTION

This invention relates to low power wireless communication systems, but more particularly to a telephone system for providing low power mobile telephone service.

BACKGROUND OF THE INVENTION

Wireless telephones, such as cellular phones, have become popular beyond expectation. Cellular phones are supported by cellular telephone systems which typically include a mobile telephone central switching exchange being connected to a multitude of geographically distributed cellular radio stations via a corresponding multitude of multichannel trunks. In populous areas, cellular systems are rapidly becoming overloaded with the result that mobile telephone services are sometimes degraded or simply unavailable. As an alternative to the cellular systems, a new standard referred to as CT2 has been recommended. This standard defines low power radio links, in a different portion of the radio frequency spectrum with respect to that of the cellular spectrum, and being functional over much shorter distances, for example distances of up to about 200 metres. It has been realized that the typical cellular system structure and radio link control methods are inefficient and unsuitable for direct application in a telephone switch incorporating the CT2 standard.

It is an object of the invention to provide a low power wireless telephony service, being supported by a small telephone system.

Small telephone systems are of two different basic architectures, namely that of a key telephone system, and that of a telephone branch exchange. In these systems, individual associated telephone sets have traditionally been wire linked to the system.

The branch exchange includes a call controller which is commonly accessible to all the telephones connected to the branch exchange. Telephone operations and telephony features are centrally provided. Beyond some minimum size, the branch exchange is more economical than the key telephone system. A wireless system supported by a branch exchange is disclosed in U.S. Pat. No. 4,771,448.

Key telephone systems are characterised in that there is little or no apparatus which is commonly accessible to the telephones connected to the system. The primary advantage of key telephone systems is one of economy with small size.

Examples of small telephone systems, are disclosed in each of U.S. Pat. Nos. 4,873,682, 4,893,310 and 5,136,585 issued in the names of George Irwin et al, David Robertson et al, and Nadir Nizamuddin et al respectively, each being titled "Digital Key Telephone System". A small telephone system is discussed by Brian Jervis et al in an article titled "New generation in key system design", pages 5–20; and is discussed by David Lynch et al in an article titled "System Architecture", pages 21–29, both published by Bell-Northern Research in Telesis 1989, Number 2. These publications are exemplary of the form of some telephone systems wherein the invention may be embodied.

SUMMARY OF THE INVENTION

In accordance with the invention, a telephone system includes a plurality of ports for transferring communications signals between radio base stations and channels in an operating signal format of the telephone system. A service controller is responsive to signalling received via a port associated with any of the radio base stations for selecting a one of the radio base stations from within the plurality of radio base stations for maintaining a radio link with a portable set of a calling or called party. A switch means is responsive to the service controller for providing a communication path via the port associated with said radio link.

Also in accordance with the invention the service controller includes a plurality of cell managers each cell manager being exclusively and logically associated with a predetermined plurality of the radio base stations. A reception characteristic of the predetermined plurality of radio base stations defines geographical operating limits of a cell within which a portable set may be radio linked with the telephone system under control of the cell manager. Each cell manager includes means responsive to signal strengths as received from time to time at any of its radio base stations including a radio base station being radio linked with a portable set for transferring the radio link from one of its radio base stations to another of its radio base stations contingent upon the other radio base station having received a greater signal strength from the portable set. Each cell manager also includes means responsive to signal strengths as received from time to time at any of its radio base stations including a radio base station being radio linked with a portable set for acting in concert with another cell manager to effect a handoff of the radio link from said radio base station to a one of the plurality of radio base stations in an neighbour cell.

In one example a digital telephone system provides communication paths for coupling station sets of calling and or called parties wherein the station sets may include portable sets and wherein a communication path associated with any portable set includes a radio link between the portable set and any one of a plurality of base station radios, each of which is connected by a communications conduit, for example a twisted pair wireline or an optical fiber, to the digital telephone system. The digital telephone system comprise a port circuit for interfacing an operating signal format of the communications conduit with an operating signal format of the digital telephone system. The operating signal format of the communications conduit includes a bidirectional message channel and at least one bidirectional communication channel, and the operating signal format of the digital telephone system includes frame organized channels. A service controller receives and transmits message signals via the frame organized channels, and including means being responsive to message signals received from any of the base station radios for causing a usable one of the base station radios to maintain a radio link with the portable set of a calling or called party. A switch is responsive to the service controller for transferring communication signals from a frame organized channel of any one port to a frame organized channel of any another port.

Also in accordance with the invention there is provided a method of completing a radio link in a small telephone system having a plurality of cells for wireless communication with portable sets each having a preassigned identity. Each cell includes a plurality of radio base stations, any one of which is operable to provide a radio link with a portable set over any one of a plurality of radio frequency channels. A portable set is operable to initiate the radio link by identifying at least one vacant radio frequency channel and then periodically broadcasting, in the identified radio frequency channel, a radio signal including a coded message corresponding to a preassigned identity of the portable set.

In one of the radio base stations, a receive signal strength indication (RSSI) level of the broadcast radio signal is detected. The received RSSI level is then registered at the radio base station. Then, in response to the RSSI level being greater than a portable originating link setup (POLS) threshold level, an acknowledgement radio signal being indicative of the channel and the RSSI level of the radio link with said portable set, is broadcasted from the radio base station a first cell manager associated with the radio base station. A telephone wireless connection is completed between the radio base station and the portable set if, the RSSI level of the radio link therebetween is at least a value of an arbitration threshold. If the RSSI level is of a lesser value than the arbitration threshold, then cell managers associated with base stations in neighbouring cells are instructed to send registered RSSI levels, if greater than the POLS threshold level, associated with said portable set to the first cell manager. The first cell manager receives the registered RSSI levels of cell managers associated with neighbouring cells and compares with the RSSI level of the radio link. The completion of a radio link at the cell manager having the highest RSSI level is then enabled.

Also in accordance with the invention there is provided, a method of establishing a call between a radio base station and a portable set, wherein an originating radio link is established with the portable set of a called party, from a radio base station. The method is used in a small telephone system having a plurality of cells for wireless communication with portable sets each having a preassigned identity. Each cell includes a plurality of radio base stations, any one of which is operable to provide a radio link with a portable set over any one of a plurality of radio frequency channels. An incoming call request for a called party associated with a portable set is received. The location of the portable set is then estimated from amongst a plurality of cells. Radio base stations having vacant radio frequency channels in cells located near a probable location of the portable set are selected. A radio signal including a coded message corresponding to the preassigned identity of a called portable set is broadcasted in at least one vacant channel of each selected radio base station After each radio signal broadcast, the at least one radio frequency channel is monitored for a portable set response broadcast including the identity of the called portable set. A portable set response broadcast is received at a first radio base station if the portable set response broadcast is of a receive signal strength indication (RSSI) level greater than a switch originating link setup (SOLS) threshold level. A radio signal indicative of the channel and the RSSI level of a radio link with the called portable set is broadcasted to a first cell manager associated with the first radio base station. A radio link between the first base station and the portable set on is then established on the indicated channel.

In accordance with an another aspect of the invention there is provided, in a small telephone system having a plurality of cells for wireless communication with portable sets each having a preassigned identity, wherein each cell includes a plurality of radio base stations, any one of which is operable to provide a radio link with a portable set over any one of a plurality of radio frequency channels, a method for maintaining an established radio link during mobile operation of the portable set while it may traverse a cell of established operation toward any neighbouring cell. In particular, radio signals in an established channel of operation are periodically broadcasted, and radio signals in the established channel of operation are received from the identified portable set via one of a plurality radio base stations in an established cell of operation. The receive signal strength indication (RSSI) levels in association with the one radio base station are registered and a running average is generated therefrom. An RSSI level for the established channel is obtained in response to a drop in the running average being more than a predetermined amount via a radio base station in a neighbouring cell. The radio link is transferred to the radio base station in the neighbouring cell, whereby the neighbouring cell becomes the cell of established operation in response to the RSSI level in the neighbouring cell being a predetermined amount more than an instant RSSI level in the cell of established operation.

BRIEF DESCRIPTION OF THE DRAWINGS

An example of a small telephone system for providing wireless connectivity with a plurality of portable station sets is discussed with reference to the accompanying drawings in which:

FIG. 8b is a block schematic diagram of the wireless community sub-system of FIG. 4a;

FIGS. 9a and 9b show search pattern clusters for a 37-cell system;

DESCRIPTION OF THE PREFERRED EMBODIMENT

General Overview

Figure 1:
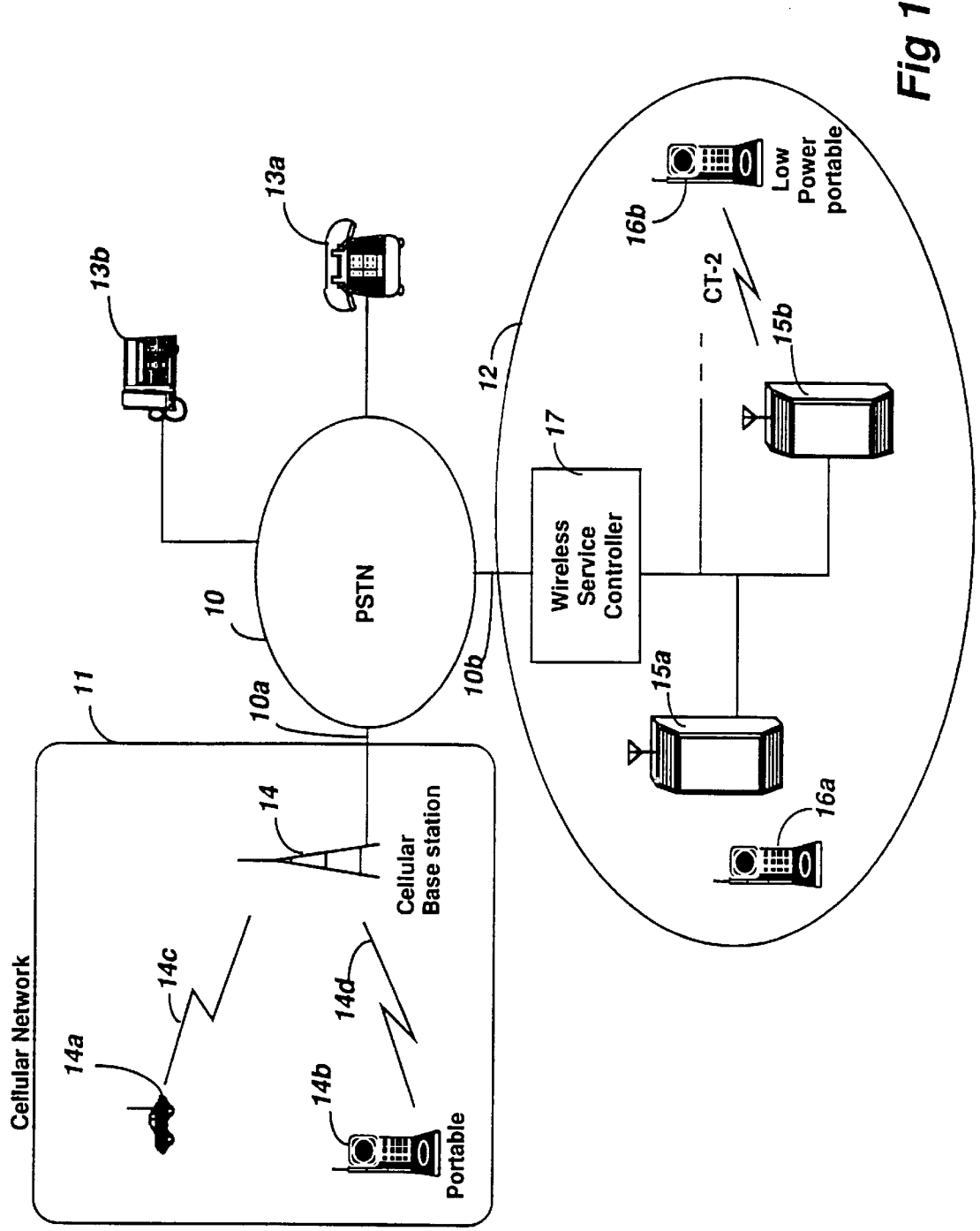
FIG. 1 is an illustration of some wireless communication systems.

In the illustration in FIG. 1, a Public Switched Telephone Network (PSTN) 10 is connected to serve a cellular network 11, a low-power wireless communication system 12 and typically wired telephone sets 13a and 13b. The cellular network 11, is used to provide telephone service for mobile and portable users, 14a and 14b, respectively, via cellular radio links illustrated at 14c and 14d. Each of a plurality of cellular base stations 14, only one of which is shown, can support many cellular radio links simultaneously. Each cellular base station is connected via a multichannel trunk 10a to a cellular switching facility (not shown) in the PSTN 10. The cellular switching facility is particularly adapted to managing cellular telephone traffic in the PSTN.

The technology of wireless or cordless telephony has evolved to provide users with a small, lightweight pocket-sized handset from which calls can be made at home, at the workplace, or near a public access point. For example, in the United Kingdom, the recommended CT2 standard is directed to second generation cordless telephony. In accordance with CT2, frequency modulated (FM) digital transmission is used between the handset and the base station. In a low power wireless communication system 12, small radio base stations 15a and 15b are intended for deployment in offices, residences, and public areas, such as airports, gas stations, and shopping malls. Radio base stations may be wireline linked to the public switched telephone network (PSTN) 10 for providing radio links with a number of subscriber terminals such as portable handsets 16a and 16b. However it is more likely that the radio base stations are wireline linked as shown to a local wireless service controller 17, which is connected via standard trunks, shown at 10b, to a host branch exchange (not shown) or a central office exchange (not shown), to provide wireless coverage restricted to a class of users in say, a private business or office building.

Figure 2:
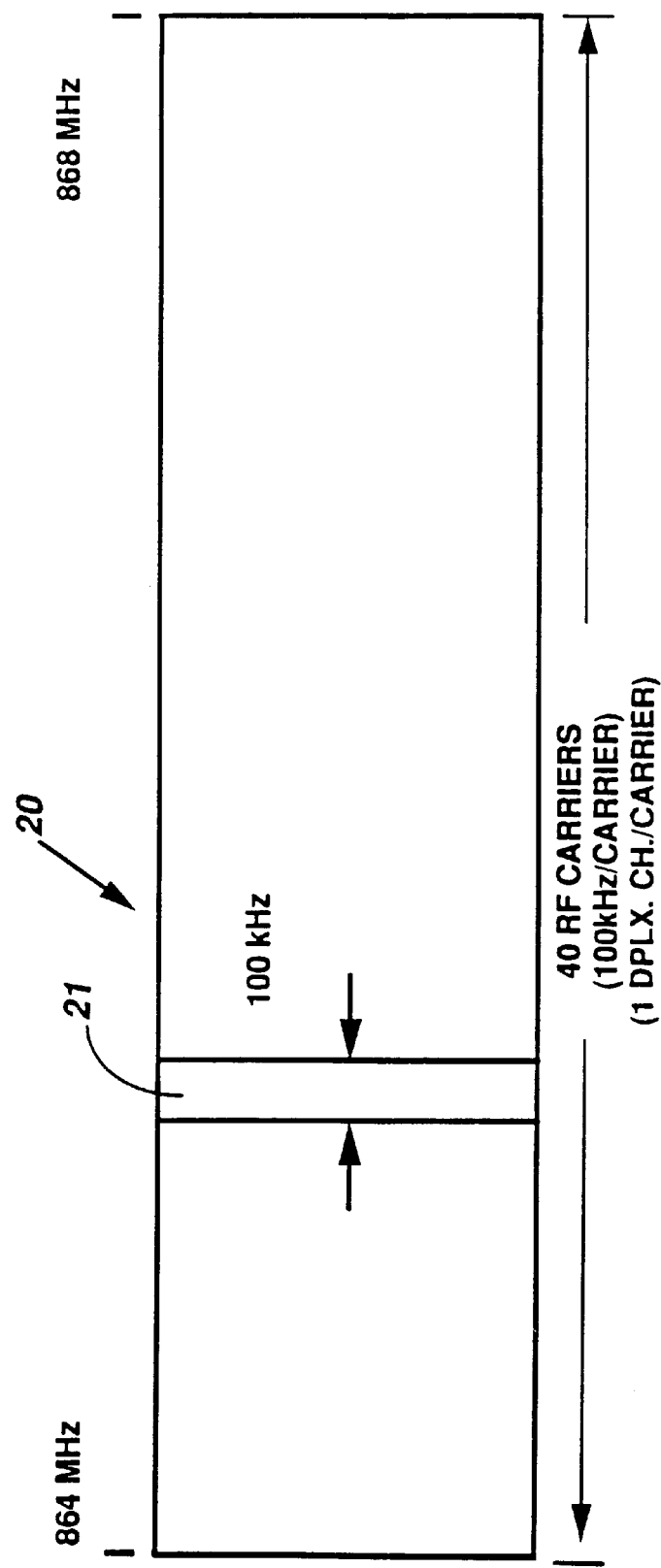
FIG. 2 is an illustration of the frequency plan for the Common Air Interface (CAI) CT2 standard.

As shown in FIG. 2, the current UK CT2 standard calls for an operating spectrum of 864–868 MHz, i.e. a 4 MHz bandwidth indicated at reference numeral 20. Within this bandwidth is provided 40 RF carriers. Each carrier 21 is used as one full-duplex channel or radio link with a bandwidth of 100 kHz per channel, i.e. in a Frequency Division Multiple Access (FDMA) mode, with time-division duplex (TDD) operation. That is, one half-duplex time slot or burst of each frequency may be used for communication from the base station to a portable handset and the adjacent half-duplex time slot or burst of the same frequency is used for communication between the portable handset and the base station. This technique is similar in principle to time compression multiplex (TCM) operation of wirelines, and is commonly referred to as "ping-pong". The bits sent in each burst are partitioned into B-channel bits, which convey user voice or data information, and D-channel bits which convey signalling information.

System Overview

Figure 3:
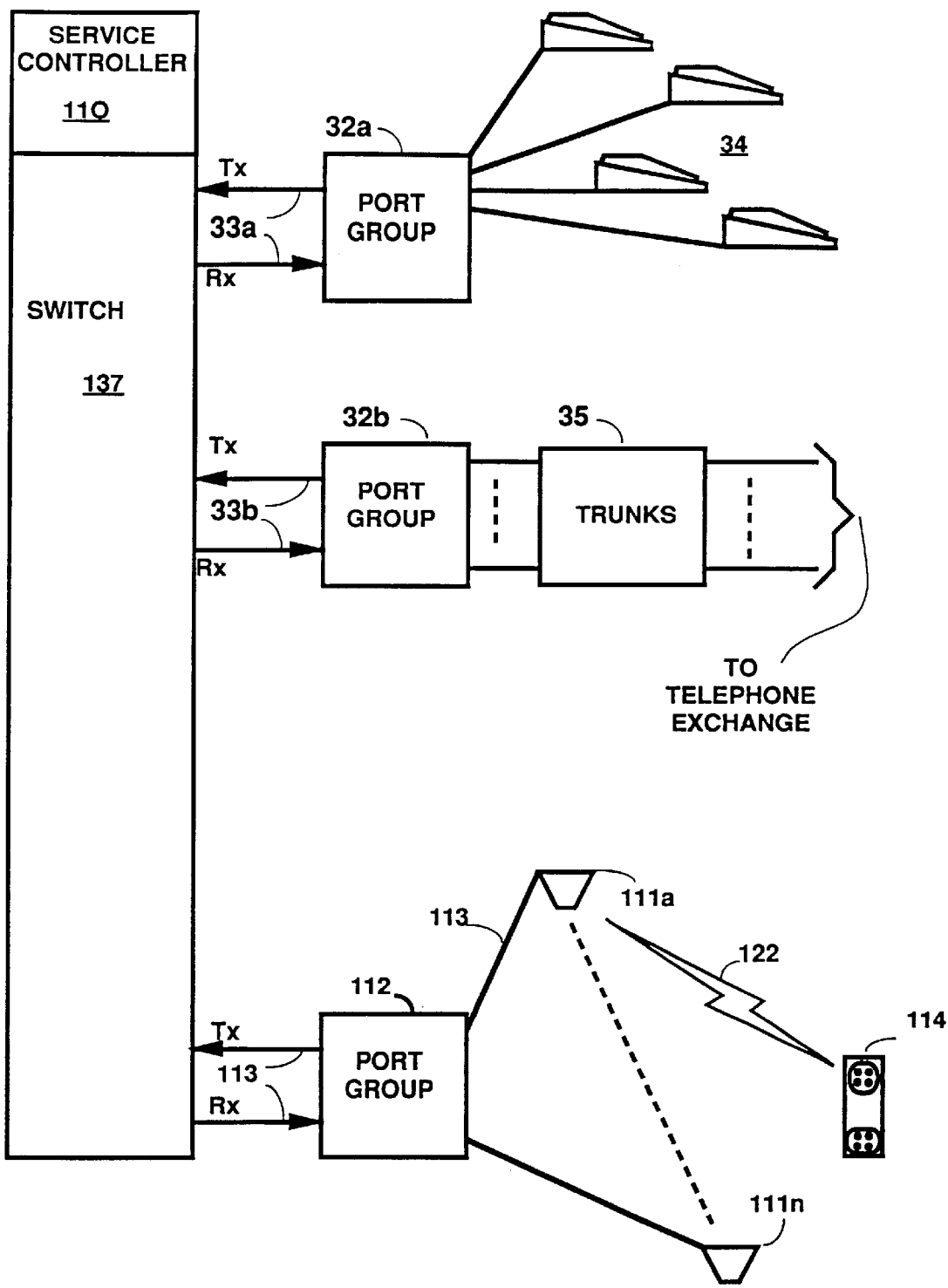
FIG. 3 is a block schematic diagram of a small digital telephone system which is operable to provide wireless telephony service in accordance with the invention.

The present invention is exemplified within a small digital telephone system as illustrated in FIG. 3, which itself may be supported by either a central or branch exchange (not shown) via either analog or digital lines or trunks 35 connected therebetween. Telecommunication services are provided between a plurality of station sets at 34 via a port group 32a connected to a service controller 110 by a transmit (Tx) line 33a and a receive (Rx) lines 33a coupled via a time switch module 37. The trunks 35 are similarly coupled as shown via a port group 32b and Tx and Rx lines 33b, and a time switch module 137. Base station radios 111a–111n are connected similarly via a port group 112 and Tx and Rx lines 113, and a time switch module 137, to the service controller 110. The base station radios are arranged into several groups, spaced apart one group from the other, each group being assigned to one of a plurality of geographic cells.

The telephone system illustrated in FIG. 3, behaves logically as though intelligence were distributed across the plurality of station sets 34, trunks 35, and the radio base stations 111a–111n as well as the service controller 110. This capability is achieved by combining a broadcast message architecture and a point to point message architecture so that functional messages facilitate control communication between intelligent entities and stimulus messages facilitate control communication with stimulus entities. Each of the radio base stations 111a–n is in logical communications with the service controller 110. From the viewpoint of its logical structure, the physical smallness of the telephone system allows for liberties that may not be available in a much larger system. The logical structure behaves as if each telephone terminal or station had its own processing power, generating and sending its own messages to every other terminal or station on the system. In physical terms, in this example, the instantaneous operating conditions of any radio link are ascertained by the operating radio base station, however decision processing power of the radio base stations is actually located in the service controller. Sharing processing power from a functional entities, in this case within the service controller, allows for lower hardware costs of the radio base stations without compromising functionality.

Hardware Architecture

As each radio base station is limited to supporting only one radio link at a time, there must be at least as many radio base stations as there are radio links to be maintained at any one instant. Hence it is important that the unit cost of the radio base stations be kept low. This is achieved in part by the radio base stations being provided by large scale integrated circuit design and manufacturing technology. Hence radio receiver operating characteristics such as selectivity, sensitivity and dynamic range must be modest.

Figure 4:
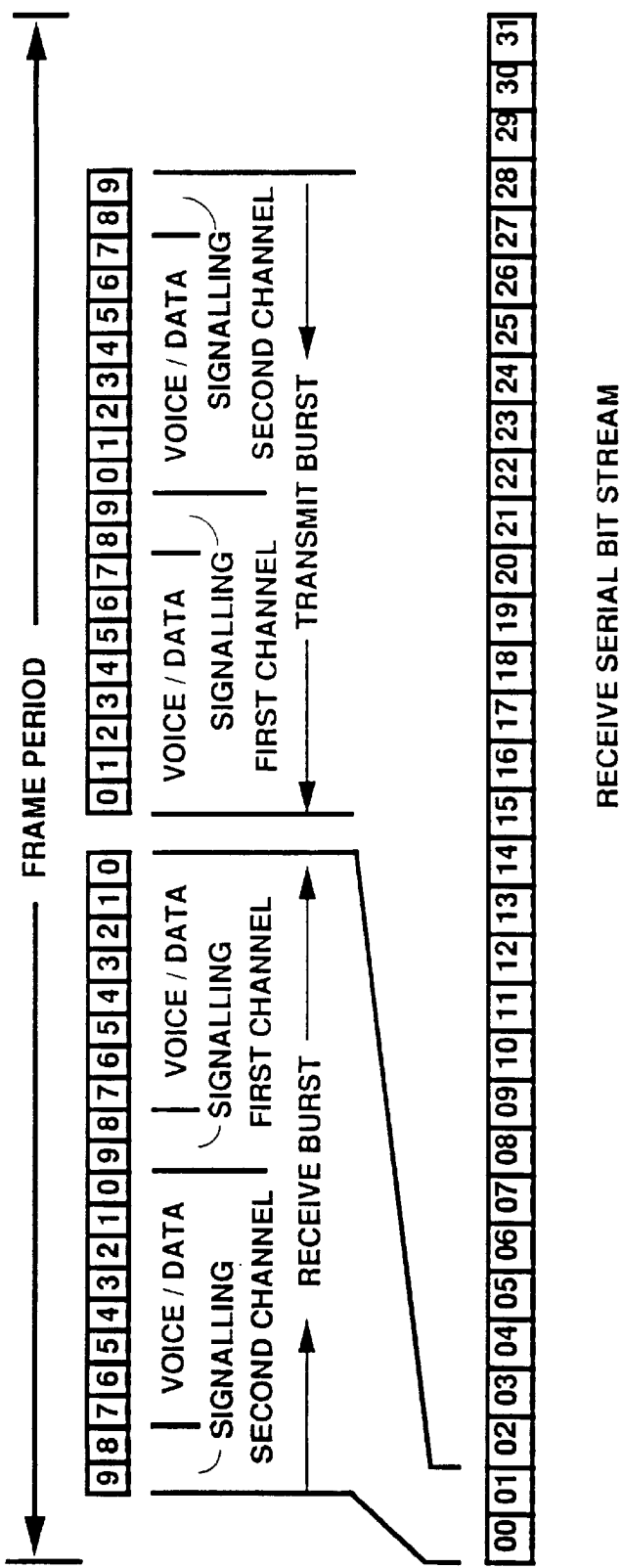
FIG. 4 is an illustration of a relationship between a time division multiplex signal format used in the small digital telephone system and a time compression multiplex (TCM) signal format also used in the small digital telephone system in FIG. 3.

As illustrated in FIG. 3 the radio base stations 111a–111n as well as telephone sets 34 are each wireline connected with port groups 32a and 112 respectively. The operating wireline signal format of the system is illustrated in FIG. 4. The wireline signal format provides transmit and receive bursts for first and second voice/data channels at 64-kb/s. These are usually referred to as B-channels. The wireline signal format also provides first and second message channels of which only the first message channel is utilized at 8-kb/s, in this example. Each of the transmit and receive bursts includes a balance bit and begins and ends with start and stop bits, not shown. Each wireline signal stream is interfaced with a predetermined pair of time slots in receive and transmit serial bit streams in the operating signal format of the service controller 110. Only the receive serial bit stream is shown in FIG. 4.

Figure 5:
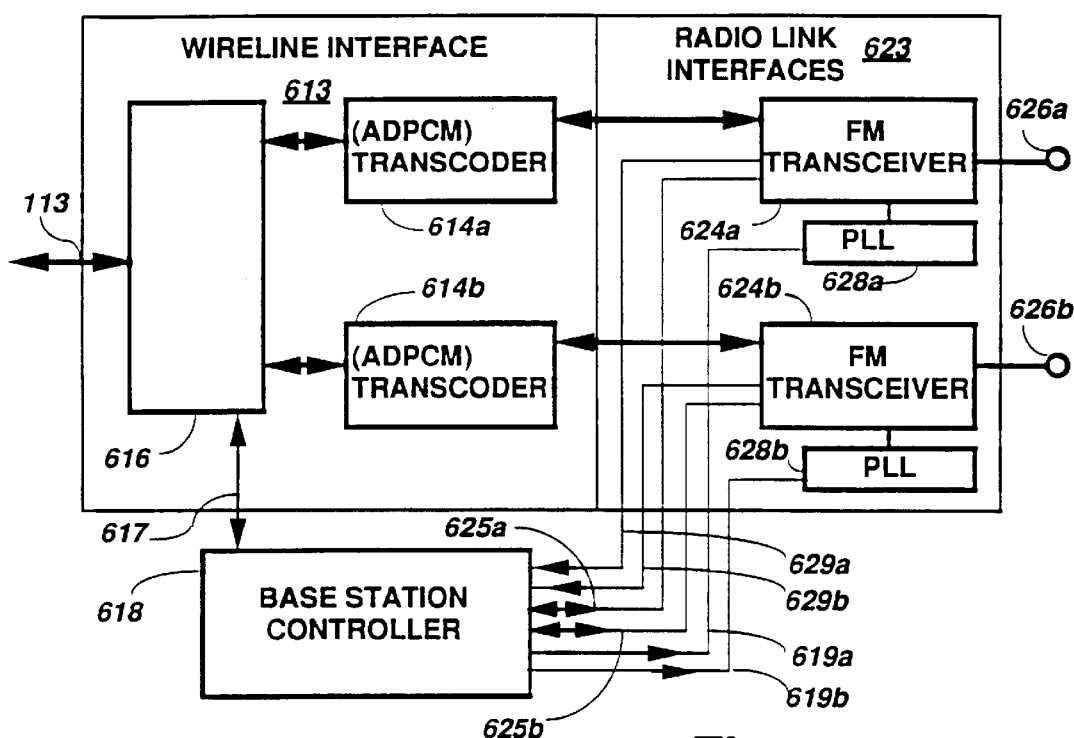
FIG. 5 is a block schematic diagram of an example of a base station radio which can be used in the small digital telephone system in FIG. 3.

Referring to FIG. 5, each radio base station includes a wireline interface 613 for transmitting and receiving information signals in a 512 kb/s TCM burst rate wireline signal format of the telephone system, and radio link interfaces 623 for broadcasting and receiving radio signals in accordance with the CT2 operating standard. A station controller 618 communicates with the first of the D-channels for sending and receiving simplex messages at an 8-kb/s rate. The wireline interface 613 includes a TCM interface circuit 616 which receives the wireline stream of TCM signal bursts and converts these into first and second voice/data bytes and first and second message bits. The first and second voice/data bytes are coupled to first and second adaptive pulse code modulating (ADPCM) transcoders 614*a* and 614*b*, for compression coding into first and second four bit words. A base station controller 618 receives the message bits from the TCM interface 616 via a message lead 617 and utilizes information contained therein to manage operations of the radio link interfaces 623. The ADPCM transcoders 614*a* and 614*b*, also receive four bit words, from the radio link interfaces 623, for expansion decoding into first and second voice/data bytes for transmission via the TCM interface 616. The TCM interface 616 transmits each assembled signal burst via the wireline 113 shortly after having received a TCM signal burst from the wireline 113. In this example, a round trip signal transmission delay of the equivalent of up to almost 900 metres of wireline between the radio base station and the port group 112 is permissable.

The radio link interface 623 includes first and second frequency modulated transceivers 624*a* and 624*b*, each being connected to receive and transmit digital FM signals. The frequency modulated transceivers are connected via message leads 625*a* and 625*b* with the station controller 618 to facilitate signalling, supervision, and data transmissions. Either one of two antennae, not shown, are coupled to a radio frequency (RF) ports 626*a* and 626*b* of the respective frequency modulated transceivers. The FM transceivers 124 uses Gaussian filtering principles, well known to persons skilled in RF signal modulation, to reduce energy overlap between adjacent frequency divided channels. At any one moment the frequencies of operation of the transceivers 624*a* and 624*b* are determined by respective phase locked loop control circuits 628*a* and 628*b*, which are dependent upon control signals exchanged with the station controller 118 via control links 619*a* and 617*b*, respectively.

Received signal strength indications (RSSI) are provided to the base station controller 618 via analog signal lead 629*a* and 629*b*. In this example, each of the FM transceivers 624*a* and 624*b* includes a demodulator circuit (not shown) which produces a d.c. voltage representative of radio frequency energy being received in the radio frequency channel in which the transceiver is operating. A suitable demodulator circuit with product code NE604AD is obtainable from Signetics. The base station controller 618 includes analog to digital converters (not shown) which generate digital levels corresponding to the respective RSSIs. Both instantaneous and running RSSI levels are developed in the base station controller for use in controlling functions related to initiation and maintenance of radio links with portable sets.

Any portable telephone set intended for use in the CT2 standard and bearing an identity code in the service controller's data base may receive telephone service. During a conversation, a portable telephone set picks up the speaker's voice and converts it to a digital signal. A digital signal is used to frequency shift modulate a radio signal in accordance with the CT2 standard. The associated radio base station receives the frequency shift modulated radio signal and translates it into a PCM bit stream for wireline transmission to the service controller 110. A PCM bit stream received via the wireline 113 from the service controller 110 is transmitted to the portable telephone set by a similar process. If data communications are required, the ADPCM transcoder in the radio base station is operated in a pass through mode so as not to interfere with data bits.

As in many TCM systems, the radio base station time division duplex (TDD) transmission intervals are synchronized so that those base stations that are active transmitters, for example as required for the maintenance of a radio link, transmit at the same time. After the transmission all of the base stations operate in a receive mode until the next time for transmission occurs. This avoids overloading receivers and helps to optimize the effective sensitivity of the receivers in the base stations. Synchronization is achieved by registering a delay value at each of the radio base stations. Radio transmissions from each radio base station is delayed such that each radio base station transmits at the same time as other transmitting radio base stations in the system.

A further operational advantage is achieved by controlling the transmit power of each linked portable telephone so that when it is far from its radio base station, it transmits at maximum-power, but when it is closer, it receives signalled instruction to transmit at a lesser power. By so restricting portable power output, adjacent channel interferences are minimized and same channel availability for coincidental reuse in more remote cells is enhanced.

In operation, functions of RF channel selection and radio base station selection for providing a particular radio link with a portable set must be rapidly achievable so that a preferred standard of telecommunication functionality and service quality, acceptable to the telephone user, can be provided. The following description is directed to the software architecture of the system operations pertinent to providing wireless telephony service.

Figure 6:
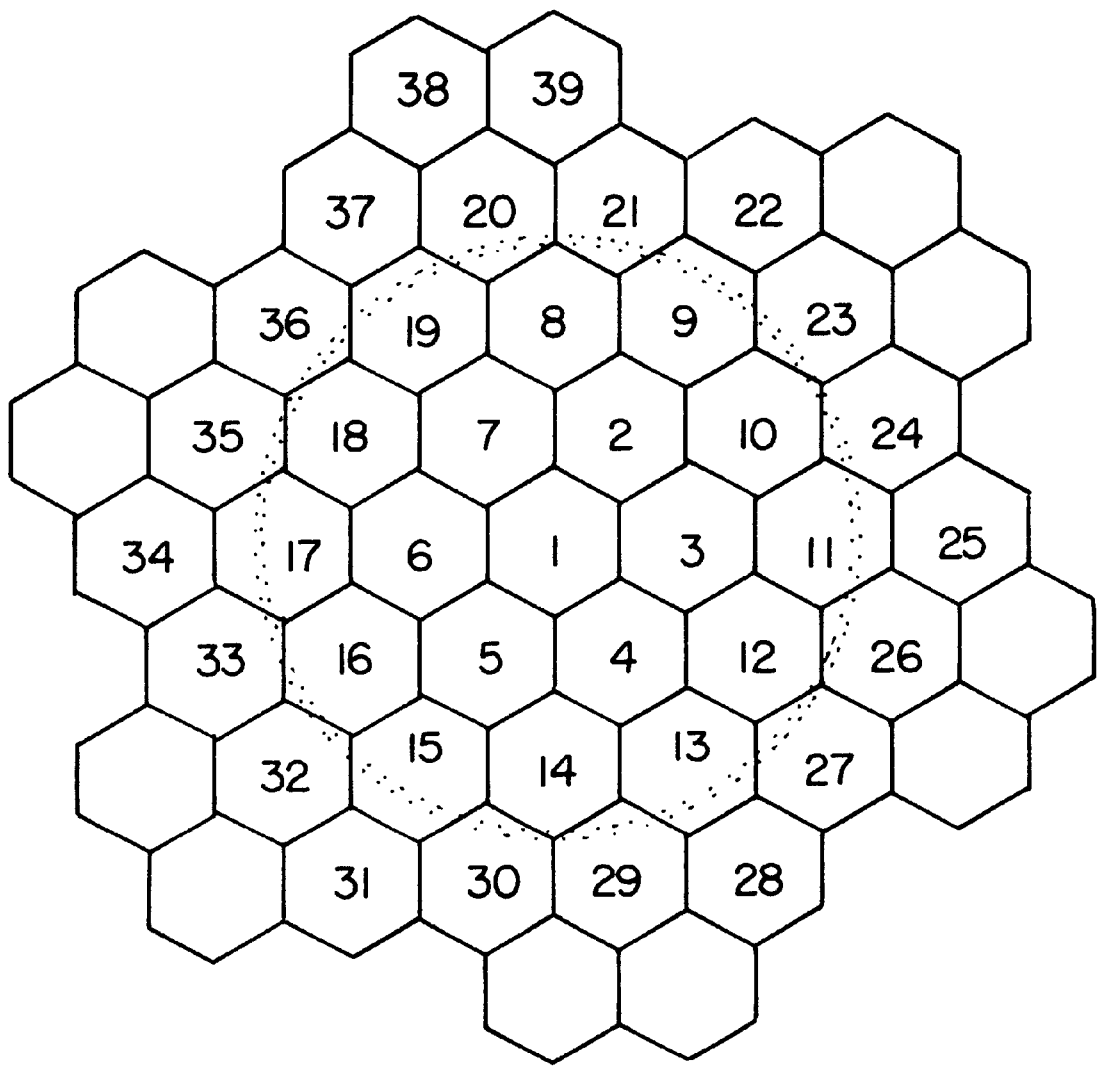
FIG. 6 shows a sample micro-cell community used in the present invention.

Mobile wireless connectivity in any given area is provided by dividing the geographic area requiring service into cells. Referring now to FIG. 6, we have shown a typical cell community structure used in providing a wireless service. For convenience of illustration, the cells are portrayed as hexagonal areas, where in actual fact the boundary of a cell is defined as a line beyond which the propagation strength or power of a radio link is deemed to be too attenuated to maintain communications. In the present invention, we introduce the terms immediate neighbours and radio propagation neighbours. With respect to cell 1 of FIG. 6, the immediate neighbours are cells 2, 3, 4, 5, 6 and 7. These are cells which share a common region or volume of operational traffic cell overlap, wherein mobility handoffs can occur therebetween. The radio propagation neighbours, cells 2–19 inclusive, are cells wherein one or more radio base stations might receive or see a radio link from a portable even though the cell may be completely disjointed in terms of an operational traffic cell.

Portable user density in a limited radio channel spectrum is provided by channel reuse. In CT2, 40 channels have been allocated in the radio spectrum. Allocation/selection of a specific channel between a portable set and a radio base station is done using dynamic channel allocation (DCA). Although any of the 40 channels can be selected or allocated by a radio base station, in a real environment, not all 40 channels can be used in each cell simultaneously because of interference between adjacent channels. The number of channels which can be effectively used in a given cell is a variable based on many factors. These include fading, multipath interference, adjacent channel interference, etc.

Mobility Thresholds

Figure 7A:
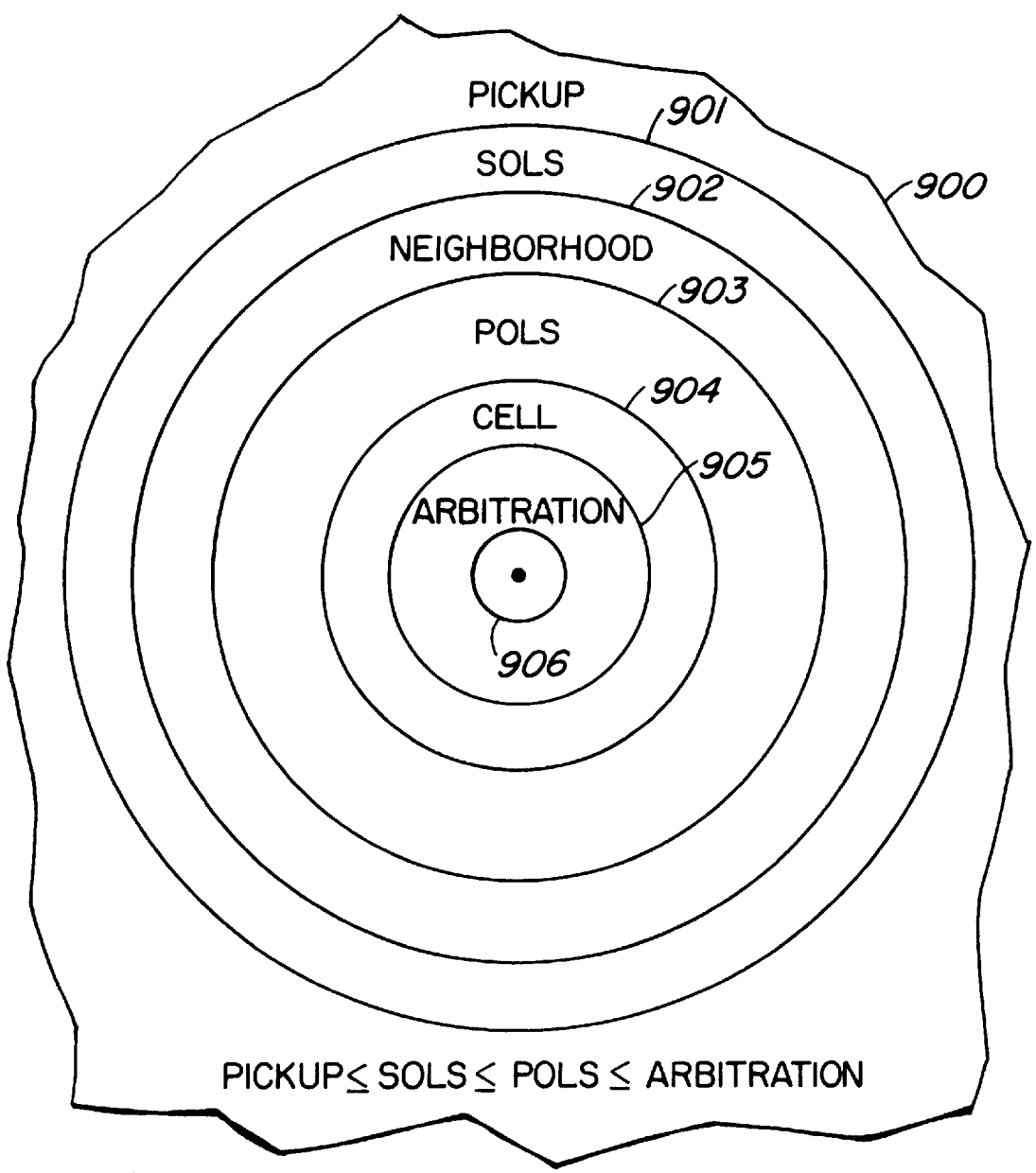
FIG. 7a shows the relationship between the thresholds associated with establishing and maintaining a radio link.
Figure 7B:
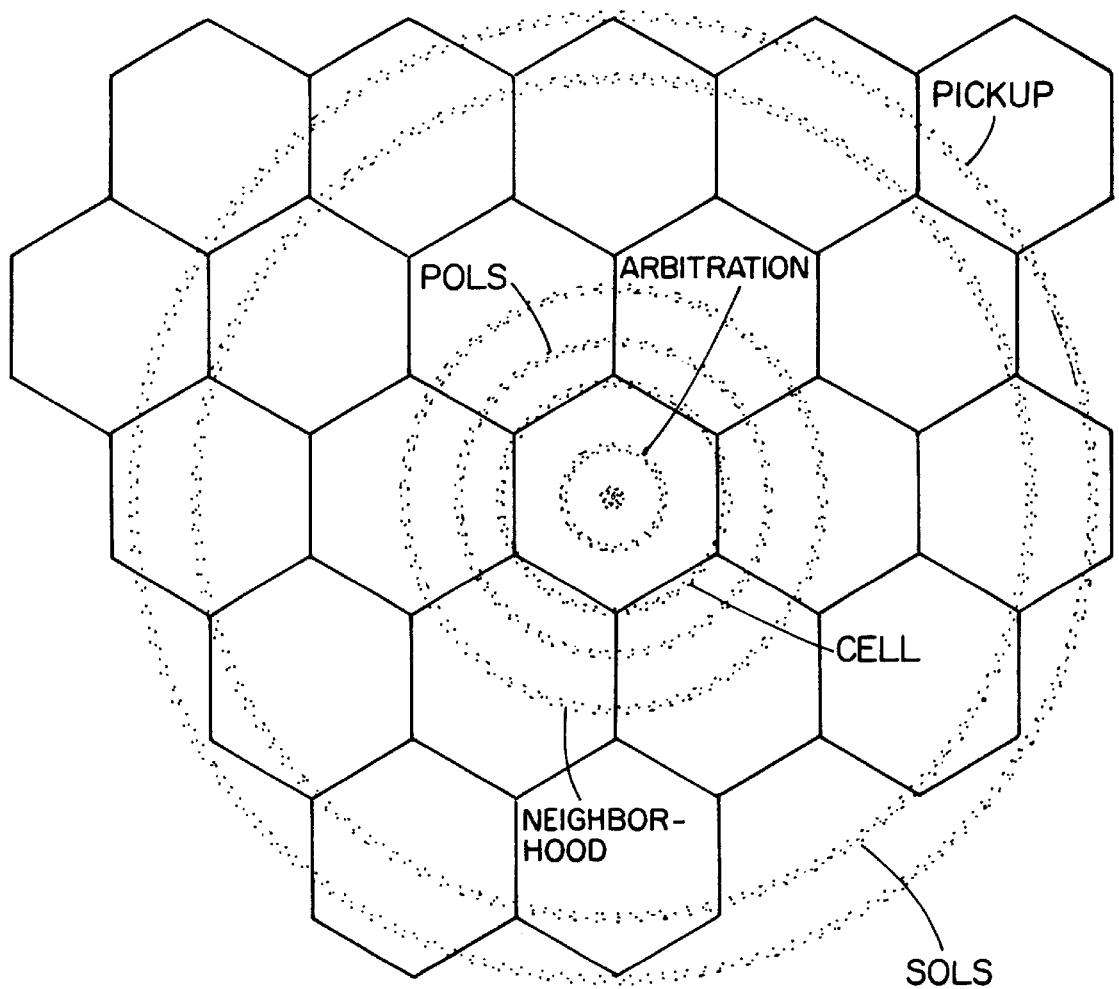
FIG. 7b shows the thresholds of FIG. 7a with respect to the cell community of FIG. 6.

The mobility of radio terminals across the geographic service area is enhanced by making use of a number of signal quality thresholds. As shown in FIG. 7*a*, the typical radio propagation area 900 of a cell varies significantly from the theoretical hexagonal shape portrayed in FIG. 6. FIG. 7b shows the same thresholds, but with respect to a cell in the cell community. The various thresholds used are described as follows:

a) Pickup threshold:

Any radio link which initially has a RSSI level below the pickup threshold 901 is not accepted by the radio base stations. This would typically reflect a Radio Signal Strength Indicator (RSSI) level below which voice quality would experience serious degradation and the link would be at high risk of being dropped.

b) Switch Originated Link Setup (SOLS):

The Switch Originated Link Setup (SOLS) threshold 902 is used by radio base stations during switch originated calls. The radio base stations will not accept a call set-up response from a portable terminal unless the measured RSSI level is greater than the SOLS threshold. The purpose of this threshold is to prevent very weak links from preempting establishment of a stronger link which may be available in another cell. In an ideal situation, this threshold will approach the maximum radio propagation range.

c) Neighbourhood threshold:

The neighbourhood threshold 903 has an RSSI level which is only known to the service controller. It is used to determine the search neighbourhood during link set up arbitration and mobility. When the RSSI level is less than this threshold, the radio propagation neighbourhood is used, otherwise the immediate neighbourhood is used.

d) Portable Originated Link Setup (POLS):

The Portable Originated Link Setup (POLS) threshold 904 is used by the radio base station during portable originated calls. The radio base station will not respond to the portable if the RSSI level does not meet the POLS threshold. The purpose of this threshold is to increase the probability of a good link being established immediately with the portable.

e) Cell threshold:

The cell threshold 905 coincides with the installation (provisioning) boundary. It is not used by the radio base station explicitly, but is used during a lost portable recovery to help determine the need for an intra-cell or inter-cell search. The cell threshold defines the traffic cell.

f) Arbitration threshold:

Arbitration is a process of attempting to establish a better radio link than an existing radio link. The arbitration threshold 906 is one where the RSSI level is very good and a better radio link for serving a specific portable would have little added benefit.

Although a handoff threshold is not used, the system makes use of a handoff method to provide a quick handoff response for a portable user who is walking away from a cell centre, yet provides a slow handoff response for a stationary user. This dynamic handoff response maintains portable connections to the closest radio base stations and reduces the frequency of RSSI level measurements.

Further details on the use of the arbitration threshold and handoff method will follow. Although the above thresholds are assumed to be static in nature, they could be changed dynamically in the cells. By using these thresholds, an effective use of the radio base station resources can be made without incurring thrashing. Thrashing is an unproductive process of repeatedly handing off a radio link from one cell to another in rapid succession. This is most likely to occur between two cells.

Wireless Controller

In order to provide the most efficient use of the 40 available channels in a traffic cell, multiple radio base stations are used. The actual number of radio base stations in each cell will vary according to expected traffic density, the physical/topographical relationship desired, and the limitations of the system. The wireless controller is used in order to manage and control the operation of each radio base station in a cell. In particular, the wireless controller makes use of a functional software entity, previously referred to as a cell manager. A cell manager controls the radio base stations in the cell.

In order to facilitate the management of calls to and from portable sets via service controller, logical addresses (LAD)s are used. Each cell in the system is assigned three different LADs. A Cell LAD to uniquely identify the cell itself, an Immediate Neighbourhood LAD assigned to the cell at the centre of an immediate neighbourhood and a Radio Propagation LAD assigned to the cell at the centre of the radio propagation neighbourhood. By assigning these LADs, a message will be delivered to a cell having the corresponding LAD and it is expected to act upon this message.

The cell manager performs LAD registration within cell neighbourhoods and radio propagation areas, initiates service controller originated calls, receives portable originated calls, monitors link status, initiates and performs call arbitrations and handoffs, controls lost portable searches, and receives administration updates.

Figure 8A:
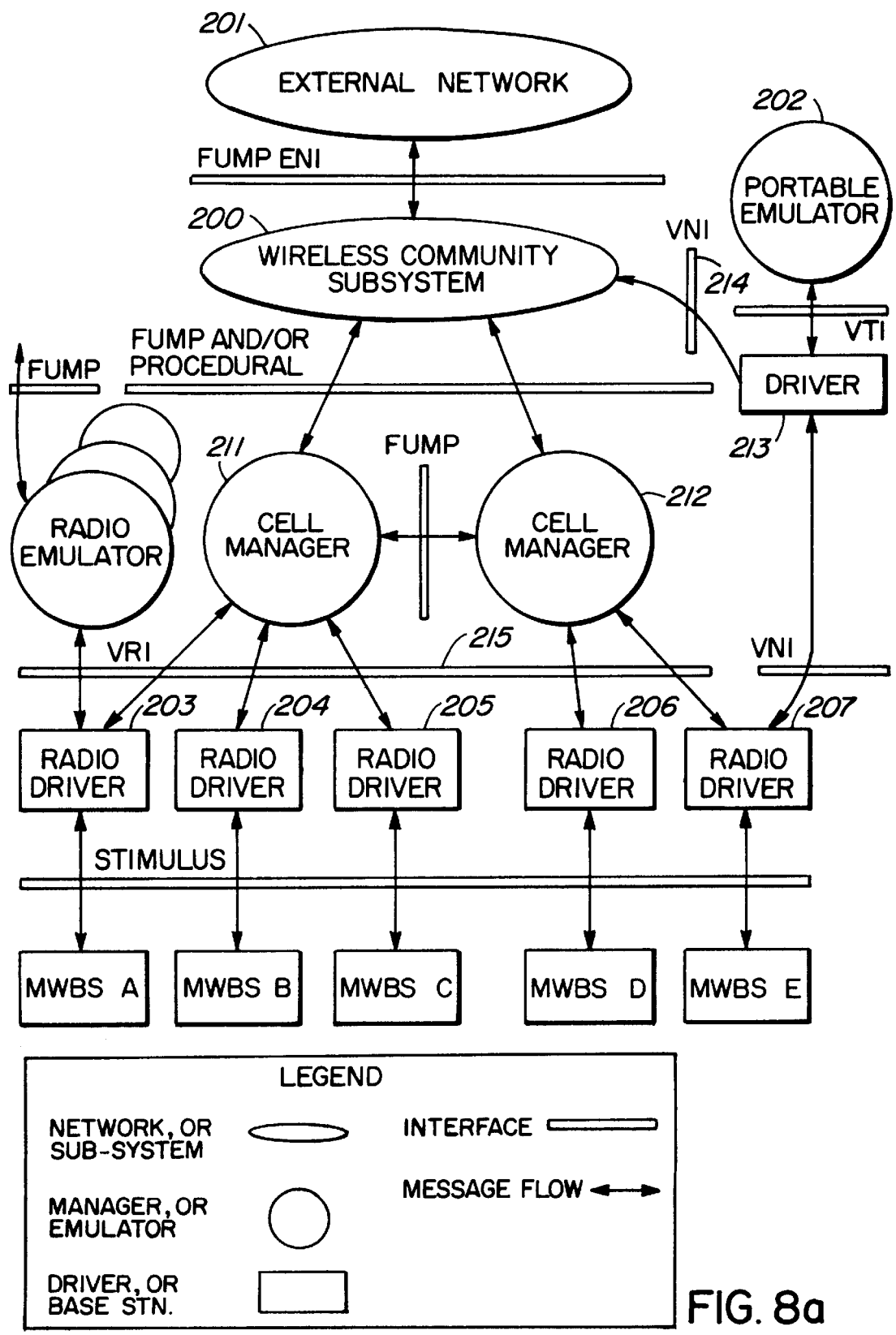
FIG. 8a is block schematic diagram which represents the software architecture useful for providing wireless telephony service in the small digital telephone system in FIG. 3.

Referring to FIG. 8a, we have shown the software architecture of the service controller 110 (FIG. 3) and the interaction of the cell managers with other functional entities located in the community sub-system 200. The community sub-system 200 interfaces with the external network 201 using functional message protocols (FUMP) via a D-channel. This interface is referred to as the External Network Interface (ENI). The community sub-system 200 is responsible for maintaining centralized control over the entire cell environment. The functional entities of the sub-system provide mobility services to the cell managers 211 and 212, portable emulators 202, and the external network 201. As stated above, the cell managers have LADs and interact with a group of radio base stations which provide a specific coverage area. In FIG. 8a, the cell manager 211 controls the radio drivers 203, 204 and 205 of base stations A, B and C, respectively, whereas cell manager 212 controls the radio drivers 206 and 207 of another group of base stations, D and E, respectively. Cell managers use the functional signalling protocol to communicate information to each other via a signalling and supervision bus (not shown). The portable emulator 202 and driver 213 will link up to a radio driver during a radio link with a portable. Thus, this link is dynamic and only exists during once a call has been set-up.

Figure 8B:
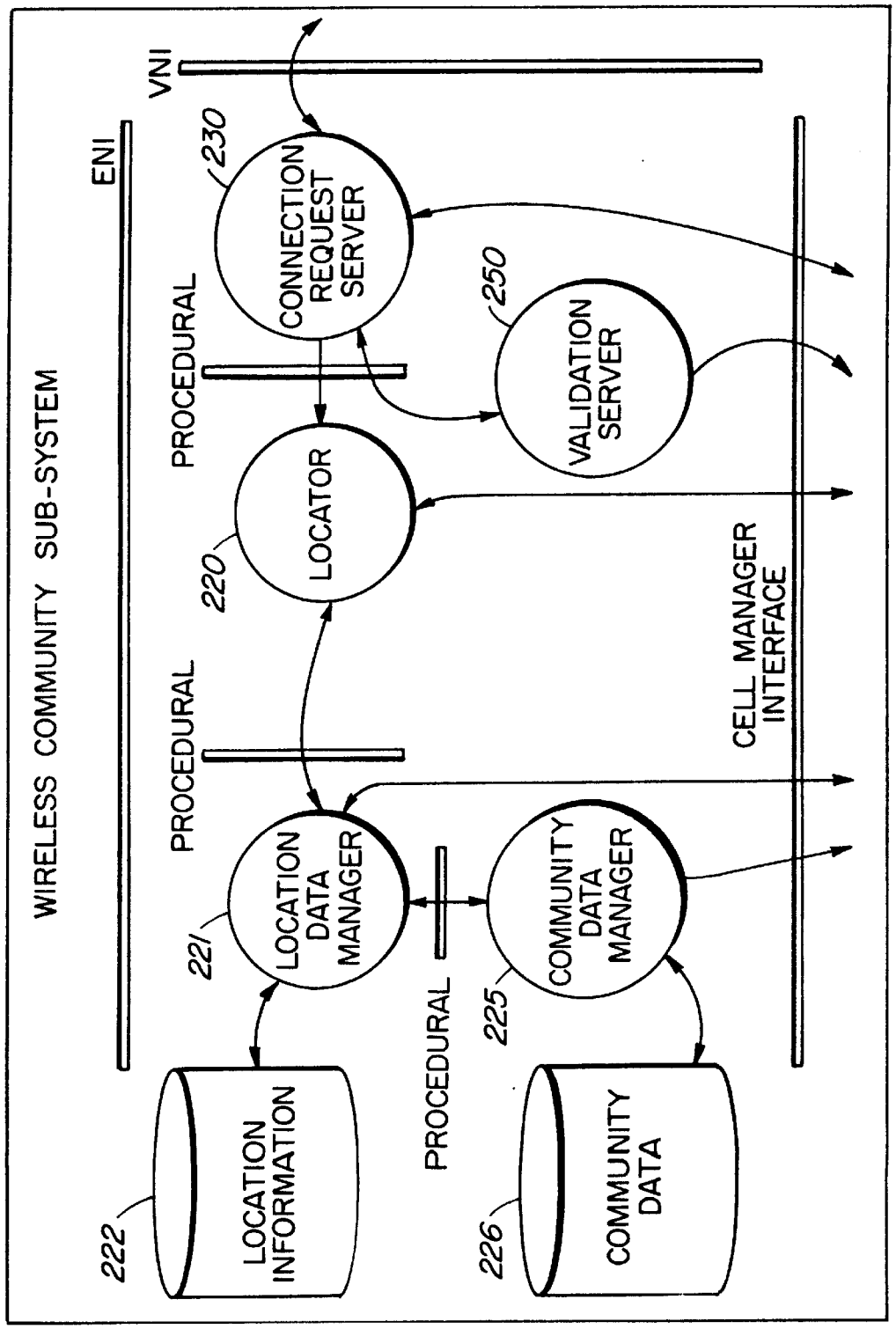

The virtual network interface (VNI) 214 between the portable driver 213 and community sub-system 200 is provided by the connection request server 230 in FIG. 8b. This interface is procedural and provides the link originate and link reject funtionalities. For example, request from portable driver to find a portable, acceptance of portable ID, response from the connection request server to the portable driver when link request as failed, etc.

The virtual radio interface (VRI) 215 is the interface between the cell managers and the radio drivers.

Referring now to FIG. 8b, we have shown the software architecture of the community sub-system 200 of FIG. 8a.

The community sub-system's functional entities include a locator 220, a location data manager 221 which has access to location information database 222, a community data manager 225 which has access to the community database 226, a connection request server 230 and the validation server 250.

Locator

The locator 220 is responsible for finding a called portable set within a minimum duration of time after arrival of an incoming call. In general, the locator maintains a record of the likely position of each registered portable set. It tries to locate a specific portable set upon arrival of an incoming call by searching for the portable set in the coverage areas. The likely position of a given portable set, even if it is not exact, is useful in search optimization. The actual search technique varies according to the size of the system. For example, if the number of cells required is relatively small, the number of search steps required in order to complete the locating process is minimal. For example, half the cells are searched in a first step, the other half searched in the second step and if necessary, all the cells can be searched again in a third step. The third step would only be made if the previous two had failed to locate the portable. This reduces the number of radio base stations simultaneously searching, the number of search steps required, the number of cells searched, and the number of registered portable sets affected by the search.

In a larger system, an alternate locating strategy can be used. In the system of the present invention, a two-phase post-locating method is used. During the first phase, the locator 220 makes use of an optimized three-step search using a positional histogram. The locator 220 maintains the statistically collected positional histogram for each registered portable set in the system. To collect this information, a random background group polling of portable sets is done at regular intervals. Those portable sets that have at least one call log entry since the last group polling are excluded from the polling group in order to minimize the number of portable sets having to be polled. When an incoming call arrives, the locator 220 searches for the specific portable using the portable's positional histogram. The actual number of cells searched is determined by each portable set's positional profile. The number of cells searched is twice the standard deviation (sigma) of the positional distribution curve assuming that it is Gaussian. The first step of the first phase search is limited to the cells which fall within +/− one sigma from the centre of the positional histogram. The second step search is limited to the cells which fall within +/− two sigmas from the centre excluding the cells already searched in the first step. Similarly, the third step search is limited to the cells which fall within +/− three sigmas from the centre excluding the cells searched in the previous two steps. As the search widens, the locator has a 68% chance of finding the portable in the first step, 95% in the first two steps and 99.5% in the three steps.

However, there is still a possibility that the locator may not have found the called portable set during the above described first phase search. The locator may fail to locate the called portable set for a number of reasons, including: the portable is not functioning correctly (eg. low batteries); no free radio base station is available in the cell being searched; no free channel is available in the cell being searched; etc. Thus, the search must be repeated at least once after the locator has failed to locate the portable set in the first phase.

During the second phase, the locator 220 uses a non-optimized three-step search. The aim of this phase is to search as many cells as possible using a channel control scheme, while minimizing potential radio interference with active radio links. The locator first generates a list of free channel candidates. Each radio base station is directed to use only one of the channels in the list when the channel is actually free at the radio's location. The candidate list contains, at most, seven channels selected at random by the locator. Once a radio base station has selected a free channel, it attempts to contact the called portable set. Each radio base station has to check if any of the channels given by the locator is actually free before selecting a free channel. Because there is a more likely chance of co-channel interference due to free channels being selected when all the radio base stations try to contact a portable set at once, a unique cell selection and search pattern is used. As shown in FIGS. 9a and 9b, each cell which uses a radio base station for a post-locating search is separated by at least one cell from any other cells which also use a radio base station for the search. Therefore, the co-channel interferences are minimized even in an event when all the radio base stations of the cells involved in the search happen to select the same channel for locating. In FIG. 9a, a 37-cell system is partitioned into clusters of three cells. The separation of the cells can of course be increased further when a large cell cluster size is used. For example, in FIG. 9b, the 37-cell system is partitioned into clusters of seven cells. The locator 220 selects one-third of the cells with the above pattern and instructs the cell manager to find a free radio base station in each selected cell. The radio base station in each cell, in turn, will examine the list generated by the locator and will choose one which is actually free in order to contact the portable set. If this fails, then the locator will search another one-third, and so on. The second phase search does not usually go beyond the three steps. The search is considered successful when the locator receives the portable set's ID number from a cell manager, prior to expiration of a search time-out interval.

Figure 10:
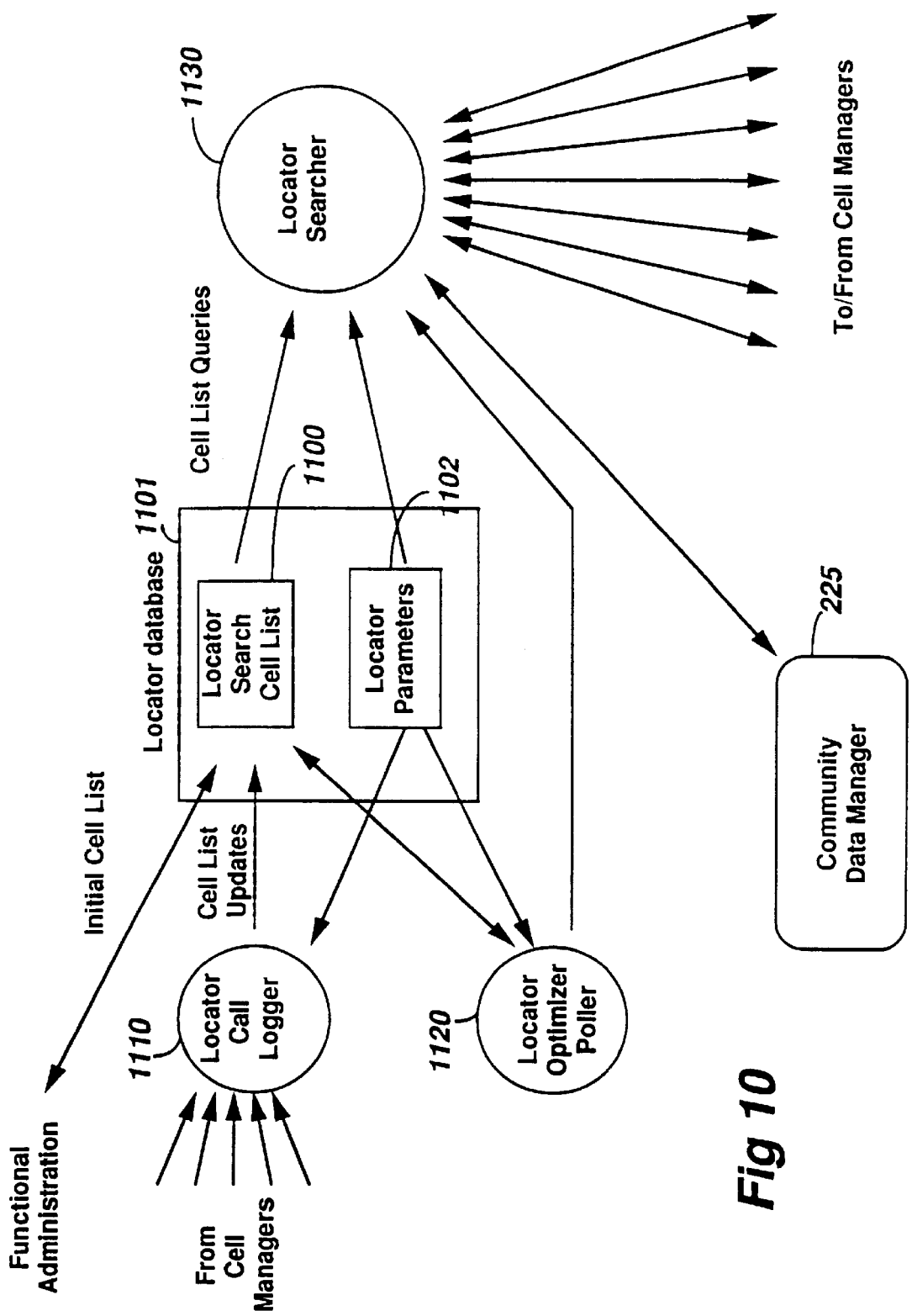
FIG. 10 shows the functional components of the locator function of the software architecture of FIG. 6b.

The functional elements of the locator 220 are shown in FIG. 10. The portable sets positional information is stored in a locator database 1100. It includes a locator search cell list 1101 and locator parameters 1102. This information is kept in a non-volatile memory and updated from time to time. A call logger 1110 is responsible for collecting positional data from the cell managers upon a normal call termination. This is used to supplement a background poll which is carried out at a random intervals. An optimizer poller 1120 polls for each registered portable set in the background at random. Polling for the portable sets is done by the locator searcher 1130 and is optimized using the previously collected portable sets most likely position. The locator 220 interfaces with a community data manager 225 during the locator's initialization to extract information about cells.

Community Data Manager

The cell community data manager 225 (FIGS. 8b and 10) manages the data defining the radio cells and the relationships between them. For example, the total number of cells in a system, the number of sets of locating cells (as exemplified in FIGS. 9a and 9b), the size of each cell, the associated LAD's of each cell and cell neighbour, etc. This information is stored in a community data file 226. The community data file contains other information used specifically by the cell manager, namely:

a) two LADs associated with each cell:

one to address the cells in the cell's immediate neighbourhood; and one to address the cells in the cell's radio propagation neighbourhood b) two lists of neighbouring cells for each cell:
   one defining the immediate neighbourhood;
   one defining the radio propagation neighbourhood (FIG. 8);
c) cell parameters including all cell thresholds and radio base station power levels; and
d) list of radio base stations associated with each cell.

Also, the community data includes information which is used specifically by the locator, namely:
a) three LADs assigned to locator scan regions;
b) three lists of cells defining the locator regions.

In addition, the community data includes record of the radio emulator or function terminal emulator, the cell to which the manager and radio base station relationship belongs, and the antenna setting of the radio base stations.

Furthermore, the previously described thresholds are stored in the community data manager. Thus, each cell is configured according to its threshold levels. Each cell manager obtains the threshold levels from the community data manager upon initialization and sends them to each radio base station as it is assigned to the cell.

Connection Request Server

A connection request server 230 (FIG. 8b) acts as the agent for both a portable driver 213 and the cell managers in order to set up a connection. In order to do this task, the connection request server requires the use of other functional entities in the controller. For example, the locator 220, which attempts to find the portable in a fast and efficient manner and the validation server 250 which determines whether or not a requested connection is valid. The connection request server 230 provides a connection service to the portable driver 213 and the cell managers.

Validation Server

The validation server 250 is responsible for restricting systems access to registered portable sets. The validation server manages the service access link identifiers (LID). There are different types of service access LIDs. The system access LID is one, and the registration LID is another. The system access LID is essentially an access code to allow portables to place calls on the system. When a portable wants to originate a call, some method of checking if that portable is allowed to use this system is required. The portable must supply a system access LID and it's portable identifier (PID). A list of registered portable PIDs are stored by the validation server and it maintains the system access LID. Using this information, the validation server can determine if the connection attempt should be permitted. The validation server acts as an agent of the connection server, which in turn acts as agent for the portable drivers and cell managers in order to setup connections.

Arbitration

As indicated briefly above, arbitration can be defined as attempting to establish a better link given an existing link. It has been found that when arbitration is used, interference is dramatically reduced. Arbitration can be implemented during call set-up which is originated either from a calling portable set or the service controller. For example, arbitration would be performed when the initial RSSI level obtained by the radio base station while establishing a link is lower than the acceptable arbitration threshold. Similarly, during handoff, the cell manager will attempt to establish a new link with the portable set via the radio base station that provides the best RSSI level. This is referred to as Handoff Arbitration.

Determining when arbitration is required and the performing handoff is the responsibility of the cell managers. Determining which cell to handoff to requires knowledge of the wireless community. The arbitrator performs this function. Given an established link, the arbitrator will attempt to find a better link. In the present embodiment, the arbitrator resides within the cell manager.

The community data manager which is responsible for maintaining the wireless community data, conveys that information to the cell manager. The request by the arbitrator to neighbouring cells to listen in on a specified channel and to report its RSSI level is referred to as a SNIFF request. The SNIFF request contains the following information:

1. Type of sniff:
   Compare:
   Indicates that the radio base station only reports back to the source of the sniff request if the RSSI level measured is higher.
   Absolute:
   Indicates that the radio base station should respond with the RSSI level if it can see the portable set is detected.
2. Portable ID:
   This is the identification number of the portable which requires a new link.
3. Channel:
   This is the channel which is contested in arbitration and which other radio base stations need to access in order to listen.
4. Sniff Challenge RSSI Level:
   RSSI level used to compare against the measured RSSI level in the sniff compare option.

When a cell manager wants to arbitrate, it broadcasts a functional sniff message. Neighbouring cells, i.e. cells in the radio propagation area, see the sniff request and listen in on the specified channel for the specified portable set. If any of the cells can see the specified portable with an RSSI level above the RSSI level associated with the existing link and above the sniff response threshold, then it reserves the channel and sends a positive acknowledgement to the cell manager requesting arbitration. The sniff response threshold allows handoff attempts to be controlled in high traffic situations since the sniff request reduces the time a radio base station is busy (on a failed sniff request where the radio cannot see the portable or its RSSI value is not high enough). The arbitration requester then tabulates the arbitration responses and determines whether or not to initiate handoff.

The sniff response message is a positive acknowledgement of sniff request message sent from the handoff candidate to the sniff requester. The sniff request response handshake is the initial negotiation for a link handoff. The sniff response message will contain the PID, channel, and sniff RSSI level.

The arbitrator then broadcasts a sniff idle message. This message tells all cells which have reserved a radio base station because of the sniff request to free up that channel. The sniff idle message contains the LAD of the handoff candidate cell so that the handoff candidate will know not to free up the selected channel. Thus, all neighbouring cells will free up the radio base stations previously occupied while servicing the sniff request.

A link handoff message is used by the arbitrator to handoff the link to the handoff candidate cell which it negotiated via the sniff request-response handshake. The link handoff message will contain the PID, channel and route ID.

Figure 11:
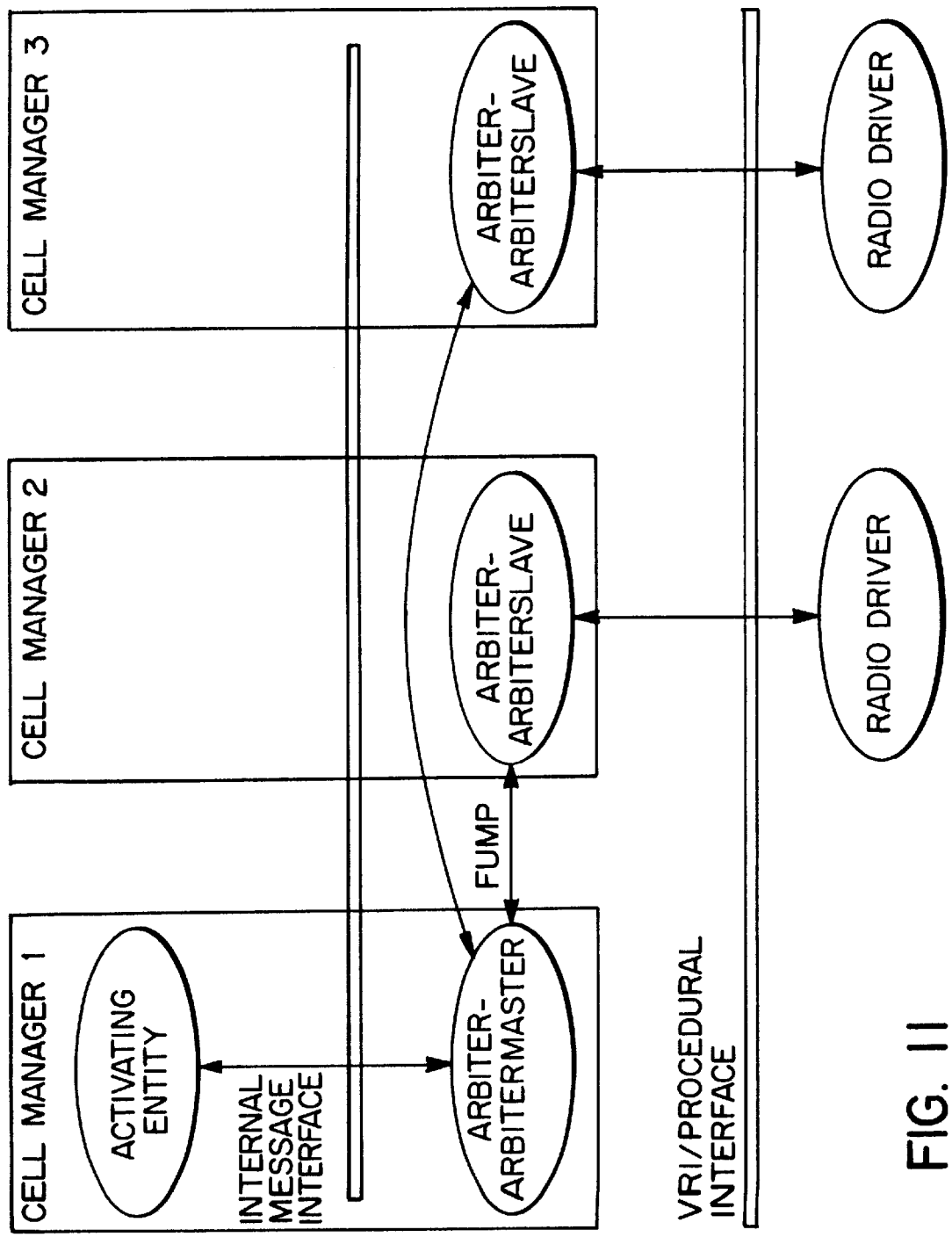
FIG. 11 shows the cell manager's functional partitioning during arbitration.

As shown in FIG. 11, the arbitration function is distributed among several cells. The arbiter functions can be divided into a master and a slave function. The arbiter master is responsible for sending the sniff request message to its neighbour and picking the better link, if any, for possible handoff. This is performed in the cell where arbitration is attempted.

Figure 12A:
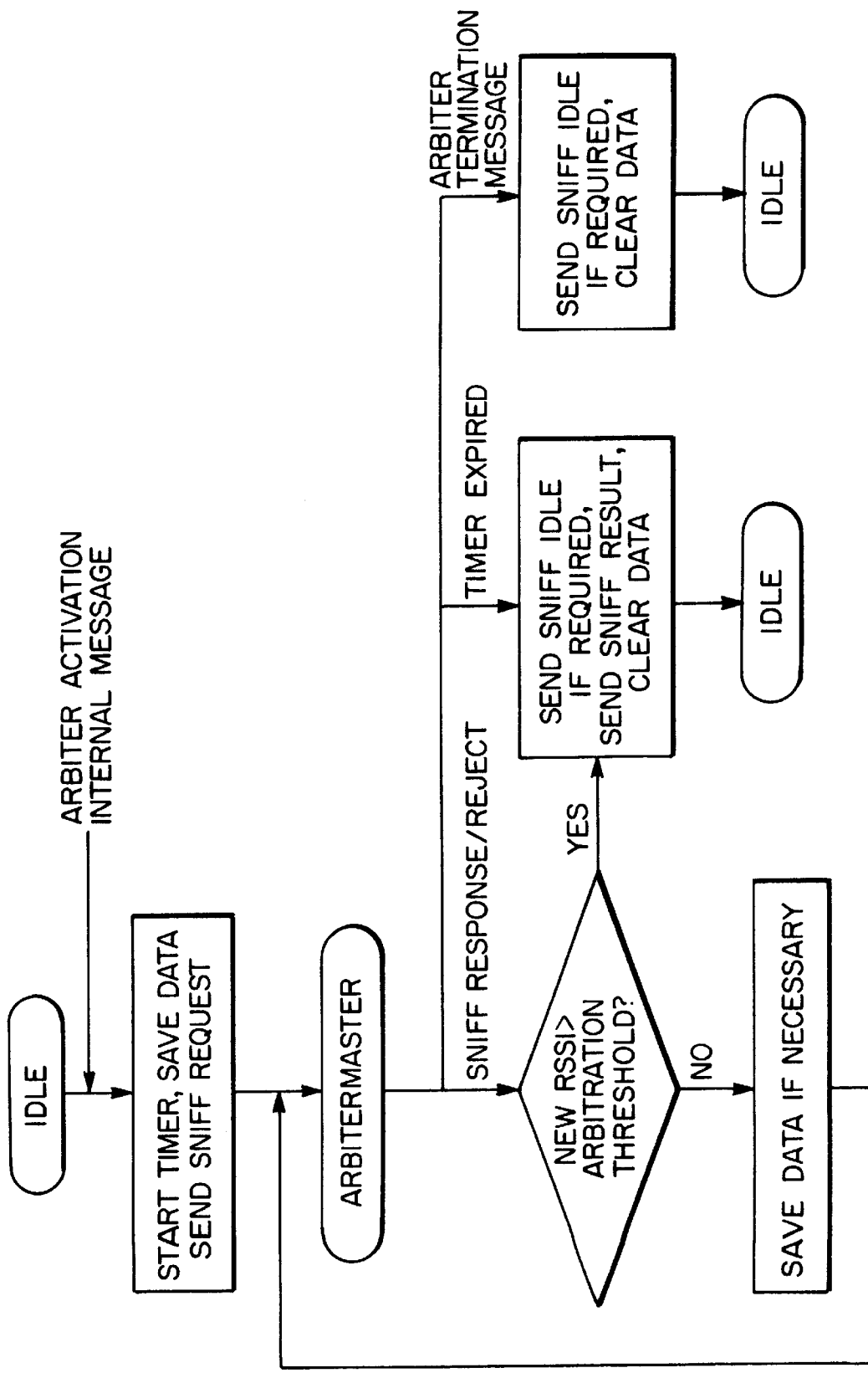
FIG. 12a shows the logic flow chart for the arbitrator-master function.
Figure 12B:
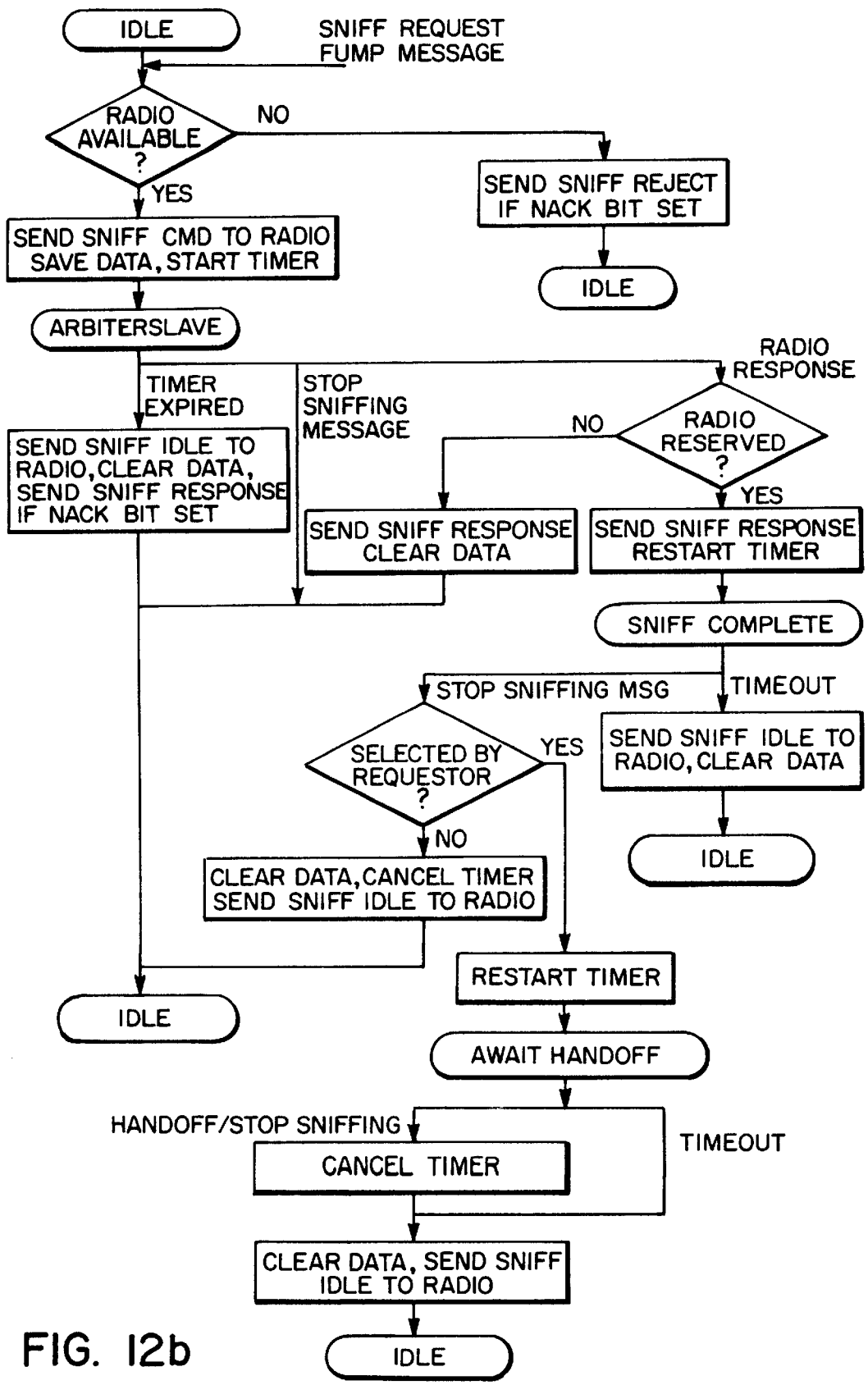
FIG. 12b shows the logic flow chart for the arbitrator-slave function.

The arbiter-slave is responsible for activating the radio base station to sniff for the target portable set after receiving the sniff request from the arbiter-master. As stated earlier, if a better RSSI level for the target portable set can be found, then the result will be returned to the arbiter-master in the sniff response message. The arbiter-slave functions are performed in the neighbours of the cell where the arbiter-master is located. As shown in FIG. 11, cells 2 and 3 are neighbours of cell 1. FIG. 12a shows the functions performed by the arbiter-master for each sniffing activation. FIG. 12b shows the functions performed by the arbiter-slave after a sniffing request is received.

Handoff

In a wireless system it is desirable to have a portable communicating with the best base station available. As a result when a portable is moving out of the coverage area of one base station and into the coverage area of another base station, it is desirable to handoff the portable from the first to the second base station. Furthermore it is also desirable not to handoff a portable to another base station whenever it is stationary. To achieve these goals, the base station will monitor the portable's RSSI readings and when these readings become weaker by a number of dB's the base station will inform the controller that a handoff is needed.

Normally, if a RSSI level decreases below a handoff threshold, the radio base station serving the portable set will send a handoff request to the cell manager. The cell manager sends a sniff request to a radio base station in each of the cell neighbours of the cell serving the portable set. Each radio base station receiving the request from its cell manager will dedicate time to detect the presence of the link and report the RSSI level back to the cell manager. The cell manager then selects which of these radio base stations with the strongest RSSI level is the candidate to take over the link.

With a low power wireless system, it was found that even when the portable set is stationary, the RSSI level can still vary by as much as 20 dB. For example, if this portable set was positioned such that its average RSSI level was −67 dBm for two cells, then its RSSI level would be anywhere from −57 dBm to −77 dBm. Every time the RSSI level of the link falls below say −73 dBm, a handoff request, sniff request and handoff would occur. This handoff would be heard by the person using the portable set as a half-second muting. In addition, it would also temporarily make neighbouring radio base stations busy, using up real time and causing a lower grade of service for the system.

Thus, a stationary portable set should not require handoff when the RSSI level drops. In contrast to a moving portable, the dropping RSSI level for a stationary portable is temporary and does not indicate that the signal is going to get worse.

Accordingly, there is a need for a method of determining whether or not a portable set is stationary so that a decrease in RSSI level will not cause an unnecessary handoff. Similarly, the technique must still be able to perform handoff when the portable set is moving and the RSSI level is in fact weakening as the radio link deteriorates.

Another problem encountered with low power wireless systems is maintaining contact with the closest cell. For example, when deploying a site, it is possible to have cell centres close enough together that the handoff threshold of each cell goes beyond the centre of another cell. Thus, a portable set moving from a first cell towards a second adjacent cell would not cross a handoff threshold. This results in the portable set operating at high power and blasting the radios of the second cell with a strong signal. Since the radio base stations of the second cell cannot instruct the portable to turn its transmit power down, interference would be created. Thus, there is a need to transfer or handoff a call to the closest radio base station even if a handoff threshold has not been crossed.

Yet another problem that exists is when a portable set is moving along a contour line. The RSSI level is neither increasing nor decreasing. A radio base station cannot tell the difference between this mobile portable set and one which is stationary. A person with a weak link on his portable set may hear muting which occurs when the instant RSSI level goes below the cell threshold. In an effort to improve the signal quality, this user may move along a contour towards a radio base station of another cell with the result that interference is created. Thus, there is a need to recognize these types of weak links so that a better link can be established.

Yet another problem is that radio base stations become busy when a sniff request is received. When a sniff request occurs, a radio base station needs to stop scanning for portable sets originating calls and reserve itself to check for a portable set on a particular channel and make a measurement of its RSSI level. This happens to all of the neighbouring radio base stations, i.e. those to the north, south, east, west, above and below the radio base station serving the mobile portable set. However, since the portable is only travelling in one direction, only the radio base stations in one or two cells need to sniff the request if this direction is known. If all the radio base stations are made busy by sniffing this activity reduces the grade of service for the system. Thus, there is a need to inform the remaining radio base stations that the portable is not near them so that they can remain available for incoming calls.

Figure 13A:
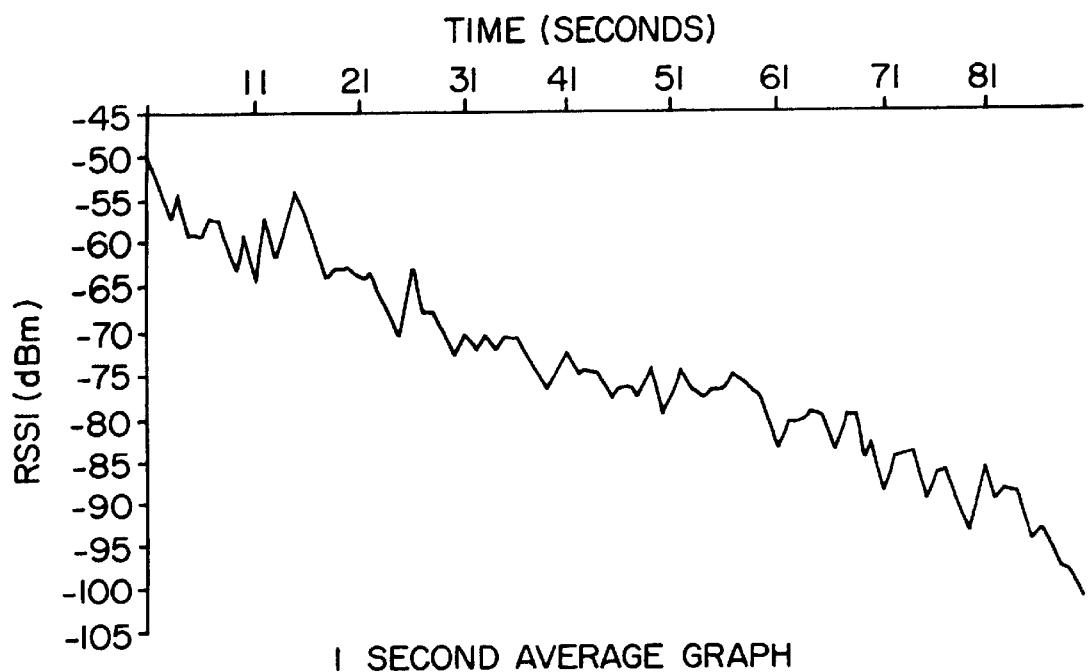
FIG. 13a is a graph showing the fluctuations of RSSI measurements over a short time interval.

As shown in FIG. 13a, when the base station controller 618 derives a 1 second average RSSI level, this 1 second average can fluctuate by up to 15 dBs from second to second.

To filter out these fluctuations, a $\Delta t$ running average of the 1 second reading is maintained. That is, at 1 second intervals the radio base station calculates a new $\Delta t$ average as follows:

$$\Delta t = \frac{\text{current 1 second average} + \text{last } (t-1) \text{ 1 second averages}}{t}$$

Figure 13B:
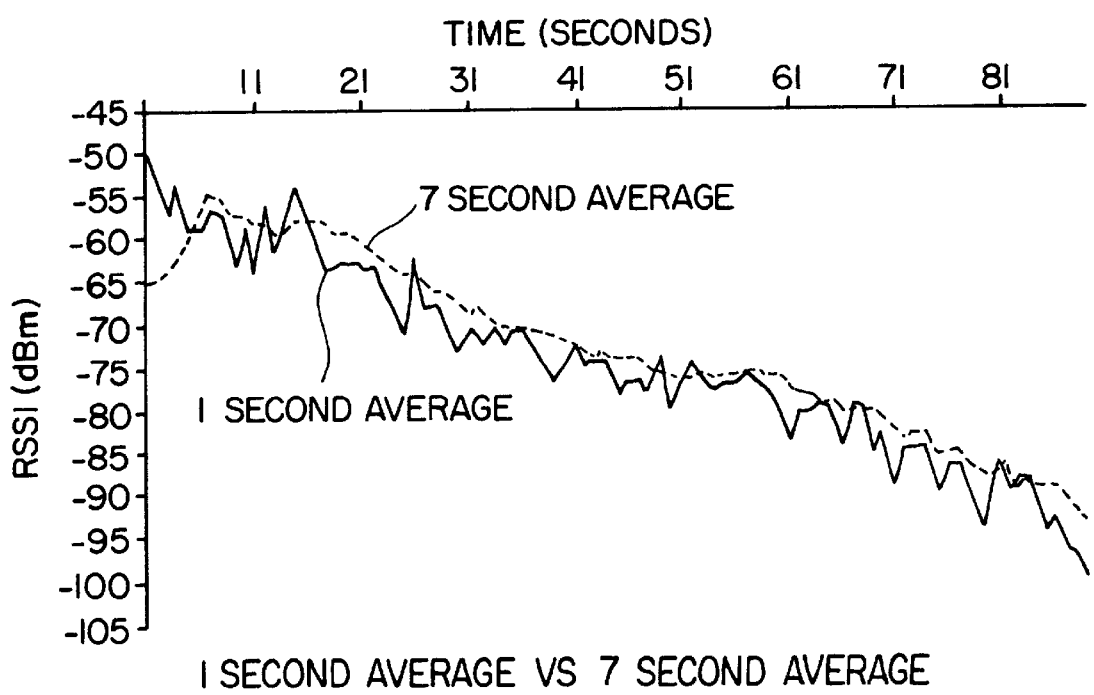
FIG. 13b is a graph showing the fluctuations of FIG. 13a, but averaged over a 7 second time interval.

This results in a smoother RSSI curve for the base station as shown in FIG. 13b. This $\Delta t$ average is tracked and its strongest peak value is recorded. If the $\Delta t$ average falls under the strongest peak value by some number of dBs, then it is assumed that the portable has moved away from the radio base station and that the portable should be handed off to a closer radio base station (should one exist). That is

```
if   (Δt average + a dB delta is less than the strongest value) then
       .inform the cell manager that a hand off is needed
       .update the peak value to the current Δt average
endif
```

At the same time, a new average peak value is derived. This is done so that if a handoff does not occur at this time, then the $\Delta t$ average will need to decrease further before another handoff request is initiated.

The strongest peak value is initialized in the first $\Delta t$ average of the link. For example, if $\Delta t$ is 7 seconds, then this is done by taking the maximum average of all the existing 1 second RSSI readings at each second, starting from the 3 second mark up to the 7 second mark. That is, at the 3 second mark, the first three 1 second values are averaged, at the 4 second mark the first four 1 second values are average, and so on. The averages at the 1 and 2 second marks are not used because it is believed that there are not enough samples at those times to calculate an accurate average.

This process can also include provisions for ignoring a fall in the 7 second average (ie. the 7 second average has fallen enough to request a hand off but since the 7 second average is still stronger than some threshold, the handoff request is not made) and for entering a panic mode when the 7 second average has fallen too low (ie. when the 7 second average falls below some threshold, a handoff request is made once every 5 seconds for as long as this condition persists). In the current implementation an "ignore" threshold is 0 dBm (ie. no handoff requests are blocked) while the "panic" threshold is −78 dBm.

In the preferred embodiment, this process can be described as follows:

---

- at 1 second intervals the 1 second RSSI average is retrieved from the radio base station
- in the first 7 seconds the strongest peak value is initialized
- for the remainder of the time the following is done
    - update the 7 second average with the current 1 second RSSI average
    - if (7 second average is lesser or equal to the −78 dBm, the panic threshold) then
        - inform, at 5 second intervals, the cell manager that a handoff is needed for as long as this condition persists
        - update the strongest peak value to the current 7 second average
    else if (7 second average is greater than the strongest peak value) then
        - update the strongest peak value to the current 7 second average.
    else if (7 second average + a dB delta is lesser than the strongest peak value) then
        if (7 second average is lesser than 0 dBm, the ignore threshold) then
            - inform the cell manager that a handoff is needed
        endif
        - update the strongest peak value to the current 7 second average
    endif

---

Since RSSI levels are not linear with respect to distance, a single delta value may not be adequate to trigger a handoff request.

Figure 13C:
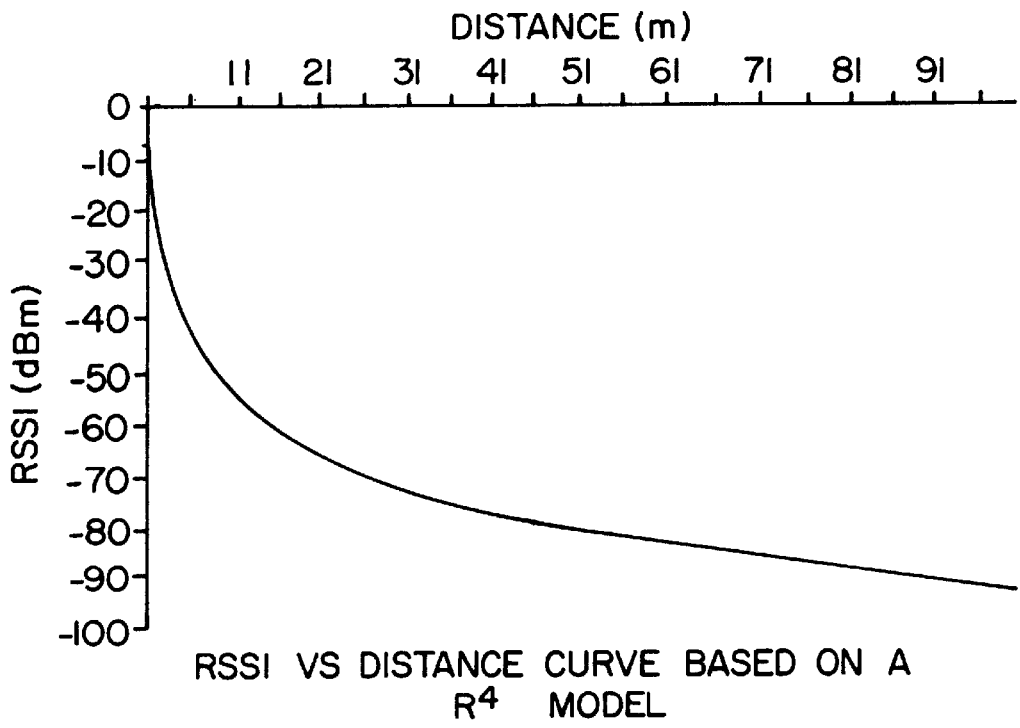
FIG. 13c is a graph showing the change in RSSI level relative to the distance from a radio source.
Figure 13D:
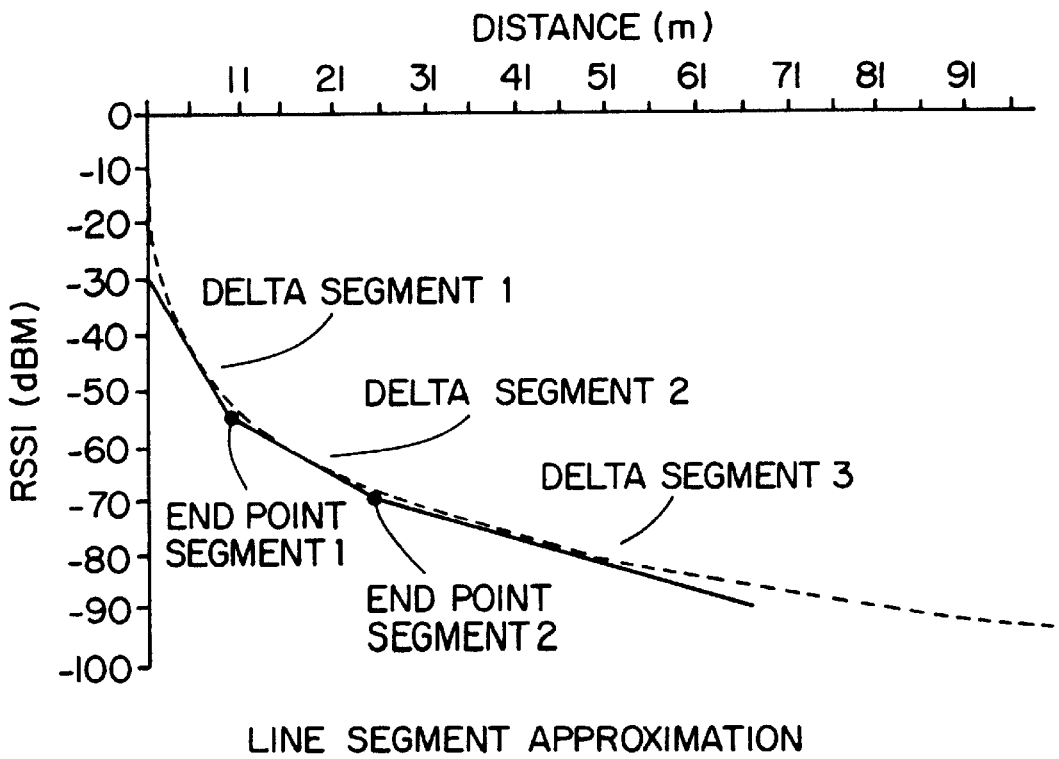
FIG. 13d is a graph showing line segment approximations of the curve of FIG. 13c.

As shown in FIG. 13c, a drop from −40 to −50 dBm can occur by moving only 5 to 6 m, while a drop from −70 to −80 dBm requires moving 15 to 16 m. So clearly, more than one RSSI level delta is required. The RSSI level delta to be used depends on the current value of the 7 second average.

Figure 14:
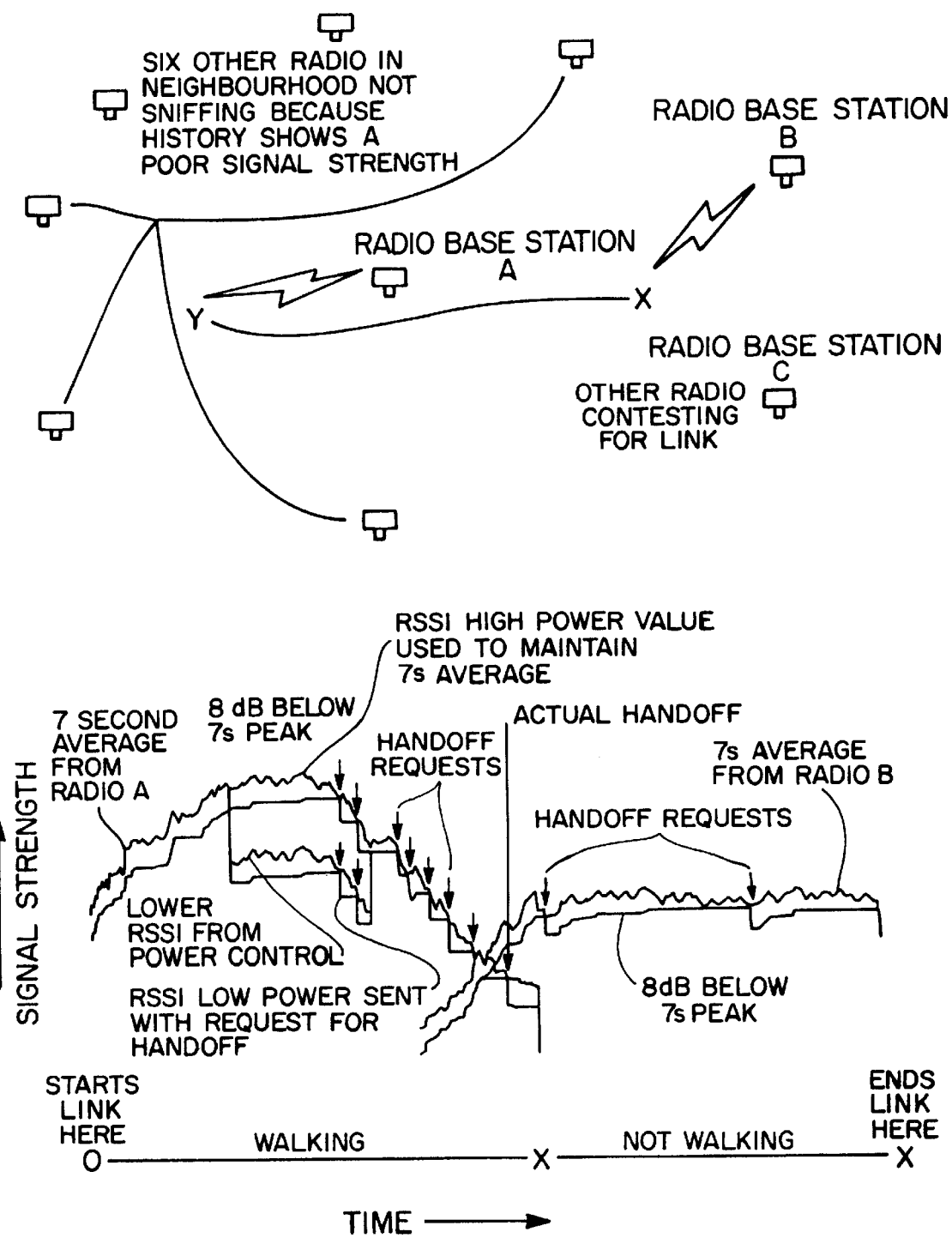
FIG. 14 shows the variations in RSSI levels over time for a typical call scenario.

The curve in FIG. 13c, is approximated by 3 straight line segments which correspond to three RRSS level deltas.

delta 1: 9 dB→0 dBm−−54 dBm
delta 2: 7 dB→−55 dBm−−70 dBm
delta 3: 5 dB→−71 dBm−−255 dBm With reference to FIG. 14, we can now describe the application of the handoff technique in a typical scenario. The illustration of FIG. 14 shows the user of a portable set using a link and walking from point Y to point X and then becoming stationary. The user first establishes a link at point Y to radio base station A. The radio base station serving the portable set measures over a predetermined time interval, a RSSI level average. For the purpose of this example, a 7 second interval is kept. Radio base station A tracks the highest or peak level for each 7 s interval since the link was established. As the user moves towards the cell centre and radio base station A, the peak average gets higher. Eventually, as the user gets closer to the radio base station, the base station controller 618 instructs the portable set to reduce its transmit power by a specified amount. In this example, a cut of 16 dB is effected. Now that the portable set is in low power mode, the radio base station alters the RSSI level routine to compensate for the lower transmit power of the portable set. In this example, a 16 dB increment is added to the RSSI level when radio base station A upgrades the 7 s average. As the user continues to move past and away from the radio base station A, the 7 s RSSI level average begins to decrease. Because the signal strength decreases, the portable set is now requested to increase its transmit power. Similarly, the radio base station alters its 7 s average RSSI level routine. If during the 7 s average the RSSI level decreases by the delta 1 value and the RSSI level is between 0–54 dBm then the cell manager sends a functional handoff request. The functional handoff request will include the radio link's RSSI level plus a delta' value, say, 6 dB. The addition of a delta' value insures that a neighbouring radio base station will have a better link available before a handoff is initiated. This eliminates handoff thrashing back and forth between two radio base stations.

In the present embodiment, all idle radio base stations scan channels for the presence of a call setup request and maintain a record of channel RSSI levels. A long term average of the RSSI levels is measured on each channel during a specific time interval, say 5 s to 15 s. Each time a RSSI level measurement of a channel is done, the signal strength average is updated and stored in a memory at the radio base station. Thus, when a sniff request is received from the cell manager requesting handoff, each neighbourhood radio base station will look up, in its memory, the long term average signal strength for the channel associated with the request. If none of the radio base stations measure a RSSI level signal above the RSSI level, then the radio link serving the portable will be maintained, that is no handoff will occur.

The cell manager controlling the radio base station serving this portable set, will initiate another handoff and sniff request every time the 7 s average drops by the appropriate delta value. As the portable set moves towards neighbouring cells, its link becomes more noticeable to the neighbouring radio base stations. As shown in FIG. 14, both radio base station B and radio base station C will observe on the corresponding channel being scanned, increasing averages of RSSI levels. Thus, when the sniff request is received by the neighbouring radio base stations, each will look up its long term average of the RSSI level for that channel. Of eight neighbouring radio base stations, six do not have long term averages above the RSSI level required in the request. Those will thus continue their routine of scanning for portable set originated calls. The other radio base stations B and C now have long term averages higher than the RSSI level indicated in the request. Radio base stations B and C stop their channel scanning routines and check to see if the signal on the channel specified is the channel serving the portable set, i.e. check to see if the PID is the right one. If the PID is convert 1 another RSSI level measurement is done by the radio base station. Based on how long they have been collecting the long term average, they proportion the final RSSI level with the long term reading stored in memory and again compare with the RSSI level required for handoff. The RSSI levels are reported to the cell manager requesting handoff. The cell manager will select the radio base station having the greatest RSSI level to complete the handoff of the radio link. In this example, radio base station B had the greatest RSSI level.

After the handoff, radio base station B starts measuring the 7 s average. If the portable set user stops moving to read something, the 7 s average from radio base station B will be fairly flat. However, as indicated earlier, a decrease in the RSSI level may still occur. If the RSSI level on the channel serving the portable set drops a delta 1, 2 or 3, depends on RSSI level value below the last 7 s average, a handoff request would be initiated by radio B. However, since neither radio A nor radio C have a measured signal above the required RSSI level, i.e. the link RSSI+4 dB, then a handoff is not initiated.

Figure 15A:
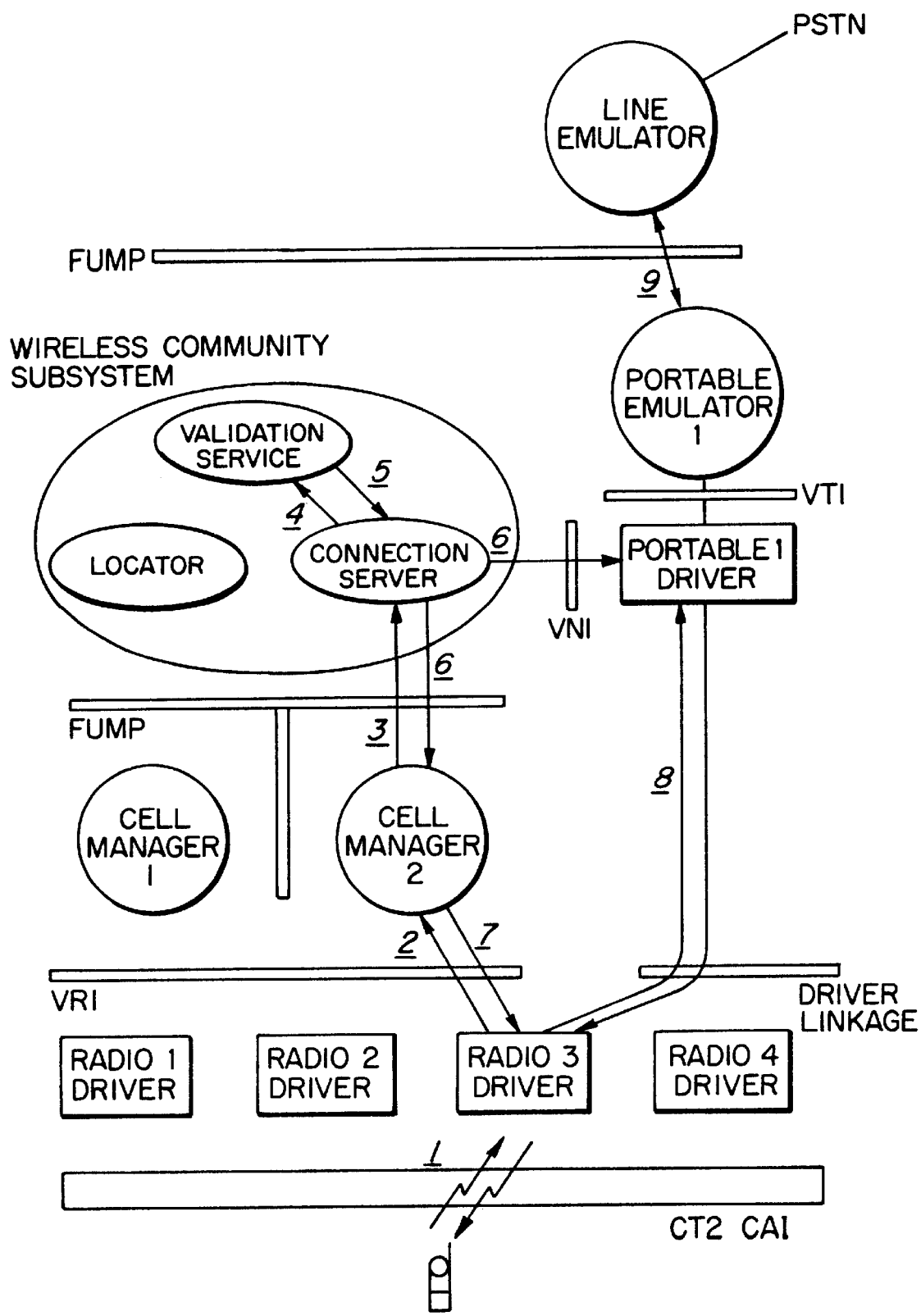
FIGS. 15a, 15b, and 15c are illustrations of sequences of function involved in establishing and maintaining a radio link in a call progress via the small digital telephone system illustrated in FIG. 3.
Figure 15B:
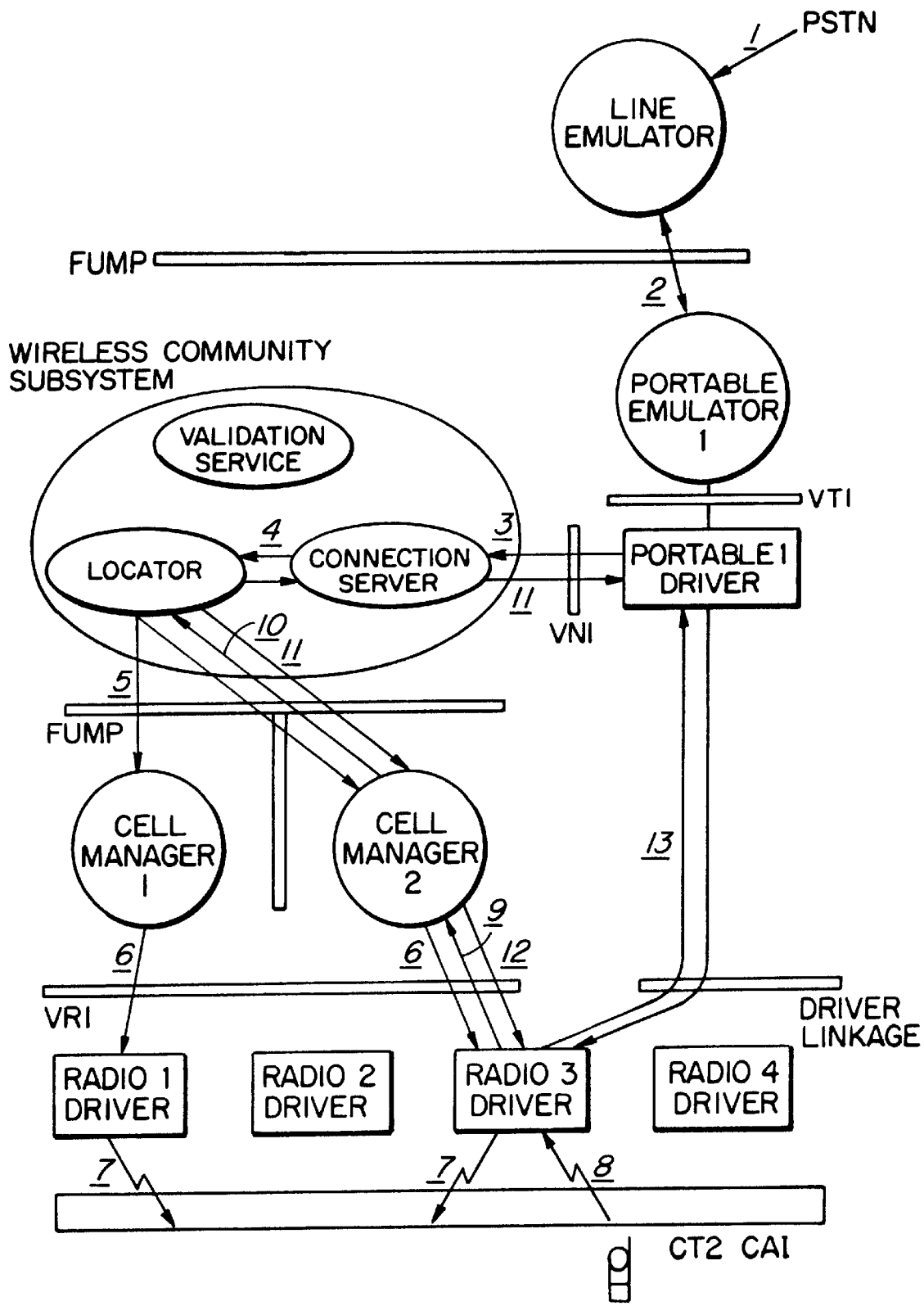
Figure 15C:
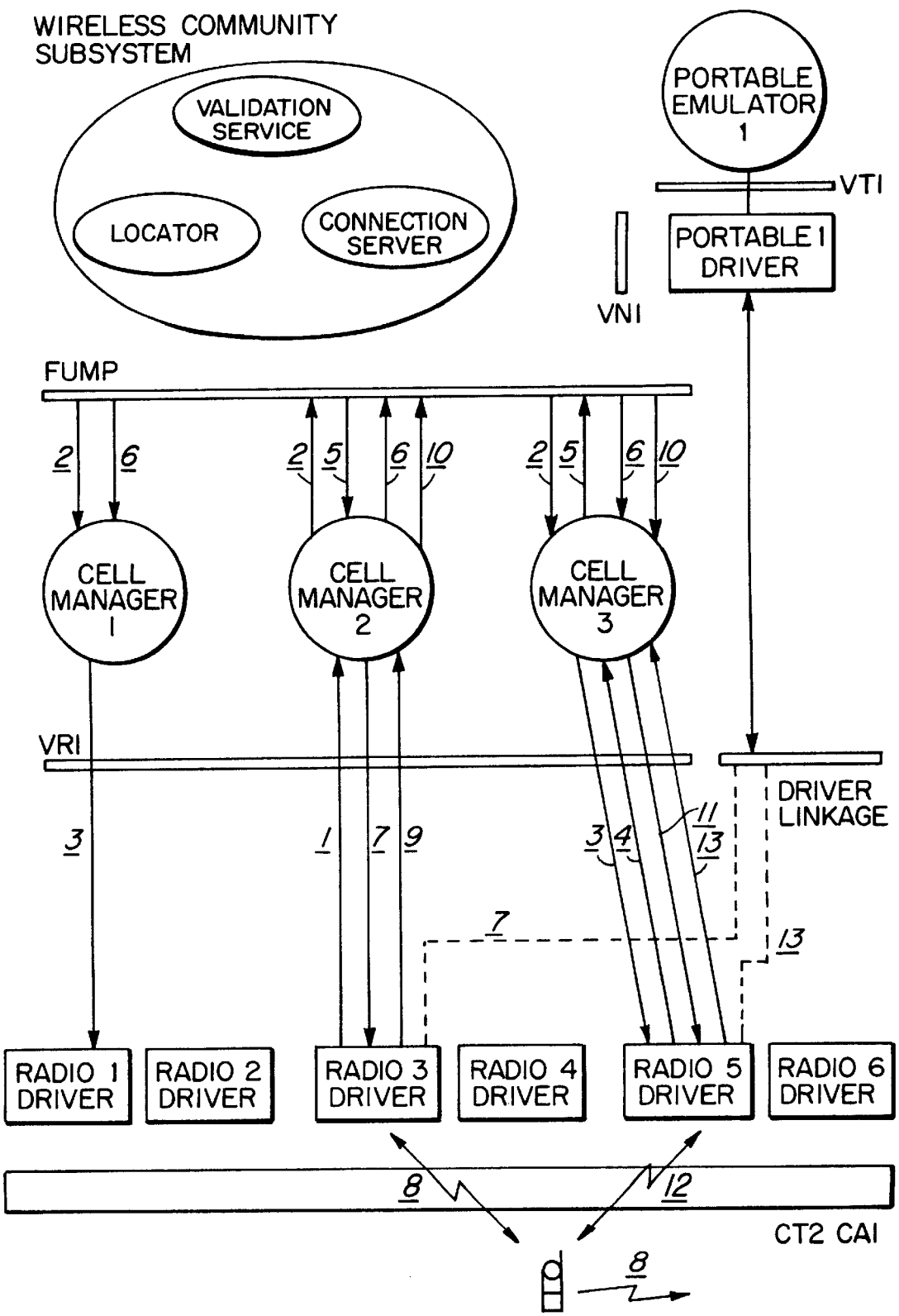

With reference now to FIGS. 15a, 15b and 15c, we will show typical call scenarios for portable and switch originated calls, as well as a controlled radio link handoff.

The sequence of events involved with a portable set cell initiative are illustrated in FIG. 15a. These events proceed as follows:

1) The portable user originates a link by causing the portable set to transmit. Radio base station 3 responds (CT2 protocol).
2) Radio driver 3 informs cell manager 2 of the link (radio 3 has been pre-assigned to cell manager 2) by indicating the presence of the link.
3) Cell manager 2 requests validation of the portable set's identification by sending a message to the connection server.
4) The connection server requests validation of the PID and LID from the validation server.
5) The validation server indicates successful validation of the PID and LID to the connection server.
6) The connection server informs portable driver 1 (associated with the PID) of ;the link's presence and sends a message to cell manager 2 accepting the link.
7) Cell manager 2 accepts the link by instructing radio driver 3 to establish valid link messaging between itself and portable driver 1.
8) Radio driver 3 establishes a link (called 'driver linkage') with portable driver 2. The portable emulator and the user are now able to communicate. Voice paths, displays and digit collection are some of the capabilities enabled at this point.
9) Portable emulator 1 sets up a connection with a line on the portable users behalf and dials digits as instructed by the portable user.

The sequence of events involved with an incoming call to a portable set are illustrated in FIG. 15b. These events proceed as follows:

1) A call is originated by the PSTN to a line terminated at the service controller.
2) The associated line emulator initiates a call with portable emulator 1.
3) Portable emulator 1 informs portable driver 1 of the incoming call. In turn, the driver requests link setup from the connection server.
4) The connection server uses the locator to find the called portable set.
5) The locator requests a group of cells (cell 1 and cell 2) for example to attempt link set up with the portable set.
6) The cells choose free radios (radio 1 and radio 3) and issue the request to search for the called portable set.
7) The selected radios execute the request.
8) The called portable set in this example is within range of radio 3 and responds to it. A link is now established.
9) Radio driver 3 informs cell 2 that it has established a link with the called portable set.
10) Cell 2 sends a message to the locator to inform it of the successful search.
11) The locator informs the portable driver that the search has been successful (via the connection server) and completes a handshake with cell 2. All other cells which were involved in the search, observe this event and free their radio base stations.
12) Cell 2 instructs radio driver 3 to establish driver linkage with portable driver 1.
13) The radio driver sets up the linkage as requested. The portable emulator is now able to communicate directly with the called portable set and initiates ringing.

The sequence of events involved with maintaining communication with a mobile portable set as it traverses a distance which crosses a cell boundary are illustrated in FIG. 15c. These events proceed as follows:

A portable set user has an established link and is mobile.

1) Radio 3 determines that the portable user's set is mobile and may require a handoff. It sends a handoff request to its controlling cell manager, in this example cell manager 2, via radio driver 3.
2) Cell manager 2 broadcasts a request to its neighbouring cell managers to execute a Sniff. It specifies the current channel and RSSI level.
3) Cell managers 1 and 3 receive the request and choose free radio base stations to execute the request.
4) Radio 5 successfully Sniffs the portable and responds to its cell manager. The radio base station is reserved for potential handoff.
5) Cell manager 3 informs cell manager 2 of its successful sniff and reports the RSSI level as seen by the radio base station.
6) Cell manager 2 sends a message to all of its neighbours to indicate that cell manager 3 is the handoff candidate. Other cell managers such as cell manager 1 return their radio base stations to idle.
7) Cell manager 2 requests radio driver 3 to issue a re-establish link request to the user's portable set. The driver linkage is broken to prevent communication attempts from the portable emulator to the user's portable set.
8) Radio 3 commands the portable set to re-establish the link, and the portable set periodically broadcasts its identification.
9) Radio driver 3 acknowledges completion of the request to cell manager 2.
10) Cell manager 2 tells cell manager 3 to pickup the link.
11) Cell manager 3 issues the pickup command to the reserved radio base station, radio 5.
12) Radio 5 establishes the link with the user's portable set.
13) Radio driver 5 informs cell manager 3 that it successfully established the link. Driver linkage is established between radio driver 5 and the portable driver. The handoff is now complete.

What is claimed is:

1. In a telephone system having a plurality of cells for wireless communication with portable sets each having a preassigned identity, wherein each cell includes a plurality of radio base stations, any one of which is operable to provide a radio link with a portable set over any one of a plurality of radio frequency channels, and wherein a portable set is operable to initiate the radio link by identifying at least one vacant radio frequency channel and then periodically broadcasting, in the identified radio frequency channel, a radio signal including a coded message corresponding to a preassigned identity of the portable set, a method for completing the radio link comprising the steps of:

a) in one of the radio base stations detecting a receive signal strength indication (RSSI) level of the broadcast radio signal on said vacant radio frequency channel;

b) registering the received RSSI level at said radio base station;

c) in response to the RSSI level being greater than a portable originating link setup (POLS) threshold level, broadcasting, from said radio base station, an acknowledgement radio signal being indicative of the channel and the RSSI level of the broadcast radio signal with said portable set, to a first cell manager associated with the radio base station;

d) completing a telephone wireless connection between the radio base station and the portable set on said vacant radio frequency channel if, the RSSI level of the broadcast radio signal on said vacant radio frequency channel is at least a value of an arbitration threshold;

e) forwarding the detected RSSI level of the broadcast radio signal of said vacant radio frequency channel to base stations of neighboring cells if the RSSI level of the broadcast radio signal is below the arbitration threshold;

f) detecting at base stations of neighboring cells the RSSI level of the broadcast radio signal on said vacant radio frequency channel;

g) instructing base stations in neighboring cells to send registered RSSI levels of the broadcast radio signal, to the first cell manager, if the RSSI level detected by neighboring base stations is of a greater value than the RSSI level of the broadcast radio signal received from the first cell manager;

h) receiving, at the first cell manager, the registered RSSI levels of base stations associated with neighboring cells to compare with the RSSI level of the broadcast radio signal; and i) enabling completion of a radio link at a base station having the greatest RSSI level.

2. In a telephone system having a plurality of cells for wireless communication with portable sets each having a preassigned identity, wherein each cell includes a plurality of radio base stations, any one of which is operable to provide a radio link with a portable set over any one of a plurality of radio frequency channels, a method of establishing a call between a radio base station and a portable set, wherein an originating radio link is established from a radio base station to the portable set of a called party over a vacant radio frequency channel, comprising the steps of:

a) receiving an incoming call request for a called party associated with a portable set;

b) estimating the location of the portable set from amongst said plurality of cells;

d) selecting radio base stations having vacant radio frequency channels in cells located near a probable location of the portable set;

e) broadcasting a radio signal including a coded message corresponding to the preassigned identity of a called portable set in at least one vacant radio frequency channel of each selected radio base station;

f) after each radio signal broadcast, monitoring the at least one vacant radio frequency channel for a portable set response broadcast including the identity of the called portable set;

g) registering the portable set response broadcast at a first radio base station if the portable set response broadcast is of a received signal strength indication (RSSI) level greater than a switch originating link setup (SOLS) threshold level, and broadcasting a radio signal indicative of the channel and the RSSI level of the radio link with the called portable set to a first cell manager associated with said first radio base station;

h) establishing a radio link between the first base station and the portable set on said vacant radio frequency channel if, the RSSI level of the response broadcast on said vacant radio frequency channel is at least a value of an arbitration threshold;

i) forwarding the RSSI level of the response broadcast to base stations of neighboring cells if the RSSI level of the response broadcast is below the arbitration threshold;

j) instructing base stations in neighboring cells to send registered RSSI levels of the response broadcast, associated with the vacant radio frequency channel used by the portable set, to the first cell manager, if the RSSI level is of a greater value than the RSSI level of the response broadcast received from the first cell manager;

k) receiving, at the first cell manager, the registered RSSI levels of the response broadcast from base stations associated with neighboring cells to compare with the RSSI level at said first radio base station; and l) enabling completion of a radio link on said vacant radio frequency channel at a base station having the greatest RSSI level.

3. A method as defined in claim 2 wherein the location of said portable set is estimated, by:

identifying and searching a first half of said plurality of cells;

identifying and searching a second half of said plurality of cells if the portable set was not found in the first half; and searching all cells of said plurality of cells if the searches of the first and second half failed to locate the portable set.

4. A method as defined in claim 2, wherein the location of said portable set is estimated, by:

randomly polling, at regular intervals, all portable sets;

maintaining a positional histogram for each registered portable set, relative each cell in said plurality of cells.

5. A method as defined in claim 2, wherein the location of said portable set is estimated, by:

forwarding a list of vacant frequency radio channels to each base station associated with separate groups of cells; and instructing a radio base station in a cell to select a vacant radio frequency channel on said list for searching for the portable set, wherein each cell which uses a radio base station for searching is separated by at least one cell from any other cells which also uses a radio base station for searching the portable set.

6. A method of maintaining wireless telephony service for a portable telephone set communicating with a first radio base station during mobile operation of the portable set while it is able to traverse a cell of established operation toward any neighbouring cell, the method comprising the steps of:

a) periodically monitoring, at said first radio base station and at idle base stations of neighbouring cells, the radio channel used for communication between said portable telephone set and said first radio base station, to maintain a record of the RSSI level on said radio channel;

b) generating a running average of a receive signal strength indication (RSSI) level at said first and idle radio base stations;

c) storing said running average in a memory at said idle base stations in said neighbouring cells;

d) in response to a predetermined drop in the running average, at said first base station, generating a handoff request to neighbouring base stations via an associated cell manager, said request providing an indication of the RSSI level of said monitored radio channel of the cell of established operation;

e) each idle radio base station of neighbouring cells responding to said handoff request if its stored running average is greater, by a predetermined amount, than the RSSI level indicated in said request;

f) forwarding the stored running average to said associated cell manager;

g) selecting in response to the received RSSI levels of idle radio base stations in a neighbouring cell, a target radio base station to act on said handoff request; and h) transferring the radio link to the target radio base station whereby the neighbouring cell of the target base station becomes the cell of established operation and repeating steps a), b), c) and d).

7. A method as defined in claim 6, wherein said handoff request includes the RSSI level of the monitored radio channel in the cell of established operation plus a delta value representing said predetermined amount.

8. A method as defined in claim 6, wherein a handoff request is generated by said first base station in response to a drop in the running average being more than a predetermined amount, wherein the predetermined amount of drop in the running average is a first delta when the running average is within a first range of RSSI levels and a second delta when the running average is within a second range of RSSI levels.

9. A method as defined in claim 8, wherein said second delta is of a lesser value than said first delta and wherein running averages within said second range of RSSI levels are of lesser value than running averages within said first range of RSSI levels.

10. A method as defined in claim 8, wherein the predetermined amount of drop in the running average is predetermined to be proportional to a most recent apex in the level of the running average.

11. A wireless telephone system for maintaining a communication between a portable telephone set and a first radio base station during mobile operation of the portable set while it is able to traverse a cell of established operation toward any neighbouring cell, comprising:

a) monitoring means, at said first radio base station and at idle base stations of neighbouring cells, for periodically monitoring the radio channel used for communication between said portable telephone set and said first radio base station, to maintain a record of the RSSI level on said radio channel;

b) generating means for generating a running average of a received signal strength indication (RSSI) level at said first and idle radio base stations;

c) means for storing said running average in a memory at said idle base stations in said neighbouring cells;

d) means for generating a handoff request to neighbouring base stations via an associated cell manager in response to a predetermined drop in the running average at said first base station, said request providing an indication of the RSSI level of said monitored radio channel of the cell of established operation;

e) means for responding, at each idle radio base station of neighbouring cells, to said handoff request by forwarding the stored running average if greater, by a predetermined amount, than the RSSI level indicated in said request; and f) a service controller for selecting, in response to the received RSSI levels of idle radio base stations in a neighbouring cell, a target radio base station to act on said handoff request and for transferring the radio link to the target radio base station whereby the neighbouring cell of the target base station becomes the cell of established operation.

12. In a telephone system having a plurality of cells for wireless communication with portable sets each having a preassigned identity, wherein each cell includes a plurality of radio base stations, any one of which is operable to provide a radio link with a portable set over any one of a plurality of radio frequency channels, said system operating to establish a call between a radio base station and a portable set, wherein an originating radio link is established from a radio base station to the portable set of a called party, comprising:

a) means for receiving an incoming call request for a called party associated with a portable set;

b) means for estimating the location of the portable set from amongst said plurality of cells;

d) service controller means for selecting radio base stations having vacant radio frequency channels in cells located near a probable location of the portable set;

e) means for broadcasting, in at least one vacant channel of each selected radio base station, a radio signal including a coded message corresponding to the preassigned identity of a called portable set;

f) means for monitoring the at least one radio frequency channel, after each radio signal broadcast, for a portable set response including the identity of the called portable set;

g) means for receiving the portable set response broadcast at a first radio base station if the portable set response broadcast is of a received signal strength indication (RSSI) level greater than a switch originating link setup (SOLS) threshold level;

h) means for broadcasting a radio signal indicative of the channel and the RSSI level of the radio link with the called portable set to a first cell manager associated with said first radio base station;

i) means for establishing a radio link between the first base station and the portable set on said indicated channel if, the RSSI level of the radio link therebetween is at least a value of an arbitration threshold;

j) means for forwarding the RSSI level of the radio link to base stations of neighboring cells if the RSSI level of the radio link is below the arbitration threshold;

k) means for instructing base stations in neighboring cells to send registered RSSI levels, associated with the channel used by the portable set, to the first cell manager, if the RSSI level is of a greater value than the RSSI level of the radio link received from the first cell manager;

l) means for receiving, at the first cell manager, the registered RSSI levels of base stations associated with neighboring cells to compare with the RSSI level of the radio link; and m) means for enabling completion of a radio link at a base station having the greatest RSSI level.

13. A method as defined in claim 6, wherein the running averages are computed for a period having a length between 5 seconds and 15 seconds.

* * * * *